US011638190B2

(12) United States Patent
Li et al.

(10) Patent No.: US 11,638,190 B2
(45) Date of Patent: Apr. 25, 2023

(54) METHOD AND APPARATUSES FOR ACCESSING UNLICENSED AND LICENSED FREQUENCY BANDS

(71) Applicant: QUALCOMM Incorporated, San Diego, CA (US)

(72) Inventors: Chong Li, Weehawken, NJ (US); Karl Georg Hampel, Hoboken, NJ (US); Junyi Li, Chester, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/455,943

(22) Filed: Jun. 28, 2019

(65) Prior Publication Data

US 2019/0320359 A1 Oct. 17, 2019

Related U.S. Application Data

(63) Continuation of application No. 15/166,129, filed on May 26, 2016, now Pat. No. 10,383,012.

(51) Int. Cl.
*H04W 36/14* (2009.01)
*H04W 72/12* (2023.01)
(Continued)

(52) U.S. Cl.
CPC ........... *H04W 36/14* (2013.01); *H04W 28/26* (2013.01); *H04W 40/02* (2013.01);
(Continued)

(58) Field of Classification Search
CPC .. H04W 36/0083; H04W 28/26; H04W 36/14
(Continued)

(56) References Cited

U.S. PATENT DOCUMENTS 8,170,001 B2    5/2012  Lerzer et al.
8,412,195 B2 *  4/2013  Yuk ...................... H04W 88/06
                                                370/310
(Continued)

FOREIGN PATENT DOCUMENTS

CN    101594153 A    12/2009
CN    101911813 A    12/2010
(Continued)

OTHER PUBLICATIONS

International Search Report and Written Opinion—PCT/US2017/030027—ISA/EPO—dated Jul. 31, 2017.
(Continued)

*Primary Examiner* — Chuck Huynh
(74) *Attorney, Agent, or Firm* — Arent Fox, LLP

(57) ABSTRACT

Various types of communication may switch from an unlicensed spectrum to a licensed spectrum. MiCr communication may be synchronized based on transmission time intervals (TTIs), which may improve the duration required to switch between bands. A MiCr system may transmit a signal to temporarily suspend other traffic in a licensed band so that MiCr communication may occur. For example, an apparatus may be configured to determine synchronization between a first radio access technology (RAT) and a second RAT based on transmission time intervals associated with the first RAT and transmission time intervals associated with the second RAT, switch from the first RAT to the second RAT after the determined synchronization between the first RAT the second RAT; and transmit, during a TTI associated with the second RAT, a first packet using the second RAT based on the switch from the first RAT to the second RAT.

22 Claims, 20 Drawing Sheets

(51) Int. Cl.
*H04W 28/26* (2009.01)
*H04W 40/02* (2009.01)
*H04W 56/00* (2009.01)
*H04W 74/08* (2009.01)
*H04L 5/00* (2006.01)
*H04L 27/00* (2006.01)
*H04W 72/0446* (2023.01)
*H04W 88/10* (2009.01)
*H04W 84/18* (2009.01)

(52) U.S. Cl.
CPC ..... *H04W 56/002* (2013.01); *H04W 72/1215* (2013.01); *H04W 74/0808* (2013.01); *H04L 5/0048* (2013.01); *H04L 5/0053* (2013.01); *H04L 27/0006* (2013.01); *H04W 72/0446* (2013.01); *H04W 84/18* (2013.01); *H04W 88/10* (2013.01)

(58) Field of Classification Search
USPC .......................................................... 455/436
See application file for complete search history.

(56) References Cited

U.S. PATENT DOCUMENTS

| | | | |
|---|---|---|---|
| 9,100,975 B2 | 8/2015 | Palanivelu et al. | |
| 10,383,012 B2 | 8/2019 | Li et al. | |
| 2007/0133475 A1* | 6/2007 | Peisa | H04W 56/0045 370/335 |
| 2008/0080476 A1 | 4/2008 | Cho et al. | |
| 2009/0122765 A1* | 5/2009 | Dimou | H04W 88/06 370/336 |
| 2011/0110290 A1 | 5/2011 | Erkip et al. | |
| 2011/0158201 A1 | 6/2011 | Yokota | |
| 2012/0039284 A1 | 2/2012 | Barbieri et al. | |
| 2012/0140743 A1* | 6/2012 | Pelletier | H04W 76/15 370/335 |
| 2013/0088983 A1 | 4/2013 | Pragada et al. | |
| 2013/0142175 A1* | 6/2013 | Manssour | H04W 72/1252 370/336 |
| 2013/0343288 A1 | 12/2013 | Ratasuk et al. | |
| 2014/0254562 A1 | 9/2014 | Shim et al. | |
| 2015/0063150 A1 | 3/2015 | Sadek et al. | |
| 2015/0264603 A1 | 9/2015 | Yang et al. | |
| 2015/0289266 A1 | 10/2015 | Hsu et al. | |
| 2016/0113008 A1 | 4/2016 | Damnjanovic et al. | |
| 2016/0119939 A1 | 4/2016 | Himayat et al. | |
| 2016/0302167 A1 | 10/2016 | Yi | |
| 2019/0281580 A1* | 9/2019 | Rune | H04W 68/02 |

FOREIGN PATENT DOCUMENTS

| | | |
|---|---|---|
| CN | 103370896 A | 10/2013 |
| CN | 103378924 A | 10/2013 |
| CN | 103379637 A | 10/2013 |
| EP | 1699249 A1 | 9/2006 |
| KR | 20080082429 A | 9/2008 |
| WO | 2012106843 A1 | 8/2012 |
| WO | 2012145706 A1 | 10/2012 |
| WO | 2013100771 A1 | 7/2013 |
| WO | 2015047777 A2 | 4/2015 |

OTHER PUBLICATIONS

European Search Report—EP20206162—Search Authority—The Hague—dated Feb. 4, 2021.
European Search Report—EP20206163—Search Authority—The Hague—dated Feb. 5, 2021.
Ericsson: "MCS Tables for Initial Partial TTI in LAA", 3GPP TSG-RAN WG1#84BIS, R1-163367, Busan, Korea, Apr. 11-15, 2016, 5 Pages.

* cited by examiner

METHOD AND APPARATUSES FOR ACCESSING UNLICENSED AND LICENSED FREQUENCY BANDS

CLAIM OF PRIORITY UNDER 35 U.S.C. § 120

The present Application for Patent is a Continuation of patent application Ser. No. 15/166,129 entitled "METHOD AND APPARATUSES FOR ACCESSING UNLICENSED AND LICENSED FREQUENCY BANDS" filed May 26, 2016, pending, and assigned to the assignee hereof and hereby expressly incorporated by reference herein.

BACKGROUND

Field

The present disclosure relates generally to communication systems, and more particularly, to wireless communication systems that are configured to communicate using both licensed frequency spectrum and unlicensed frequency spectrum.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects may employ wireless technologies based on wireless sensor network (WSN) approaches that may provide communication with improved reliability and reduced latency. Such communication may be referred to as "mission critical" (MiCr) communication. MiCr communication may be employed in both licensed frequency spectrum (or bands) and unlicensed frequency spectrum (bands). MiCr communication over unlicensed frequency bands may offer low-cost access and relatively simply complexity. For example, wireless algorithms, systems, and applications (WASA) wireless solutions for factory automation may be provided by Bluetooth-based technology that uses a 2.4 gigahertz (GHz) Industrial, Scientific, and Medical (ISM) unlicensed frequency band. However, MiCr communication (e.g., factory automation and process control) may be vulnerable to interference on an unlicensed frequency band. For example, channel access for MiCr communication may fail if the unlicensed channel is occupied by other devices (e.g., WiFi devices, Bluetooth devices, etc.) using the same unlicensed frequency band. In addition, MiCr communication may fail to achieve a desired quality of service (QoS) due to external interference (e.g., microwave interference).

In order to satisfy reliability and/or latency requirements commensurate with MiCr communication, aspects may switch MiCR communication from an unlicensed frequency spectrum to a licensed frequency spectrum. In various aspects, the MiCr communication may be synchronized based on transmission time intervals (TTIs), which may reduce the switching time to switch between the unlicensed and licensed frequency bands. In another aspect, a MiCr system may transmit a signal to temporarily suspend other traffic in a licensed band (e.g., cell phone voice and/or data traffic) so that MiCr communication may occur with a relatively high QoS.

In an aspect of the disclosure, a method, a computer-readable medium, and an apparatus are provided. The apparatus may be configured to determine synchronization between a first radio access technology (RAT) and a second RAT based on TTIs associated with the first RAT and transmission time intervals associated with the second RAT. The apparatus may be further configured to switch from the first RAT to the second RAT based on the determined synchronization between the first RAT the second RAT. The apparatus may be further configured to transmit, during a TTI associated with the second RAT, a first packet using the second RAT based on the switch from the first RAT to the second RAT.

In another aspect of the disclosure, a second method, a second computer-readable medium, and a second apparatus are provided. The second apparatus may be configured to determine that communication is to be switched from a first frequency band of a first RAT to a second frequency band of a second RAT. The second apparatus may be further configured to switch to the second frequency band of the second RAT based on the determination that communication in the first frequency band is to be switched. The second apparatus may be further configured to transmit, in the second frequency band, a silencing signal indicating that another wireless device is to suspend communication in the second frequency band. The second apparatus may be further configured to communicate in the second frequency band after the transmission of the silencing signal.

In another aspect of the disclosure a third method, a third computer-readable medium, and a third apparatus are provided. The third apparatus may be an evolved Node B (eNB). The third apparatus may be configured to monitor at least one resource reserved for silencing signals. The third apparatus may be further configured to detect a silencing signal based on the monitoring of the at least one resource. The third apparatus may be further configured to suspend transmission based on the detected silencing signal.

In another aspect of the disclosure a third method, a fourth computer-readable medium, and a third apparatus are provided. The fourth apparatus may be user equipment (UE). The fourth apparatus may be configured to monitor at least one resource reserved for silencing signals. The fourth apparatus may be further configured to detect a silencing signal based on the monitoring of the at least one resource. The fourth apparatus may be further configured to suspend transmission based on the detected silencing signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
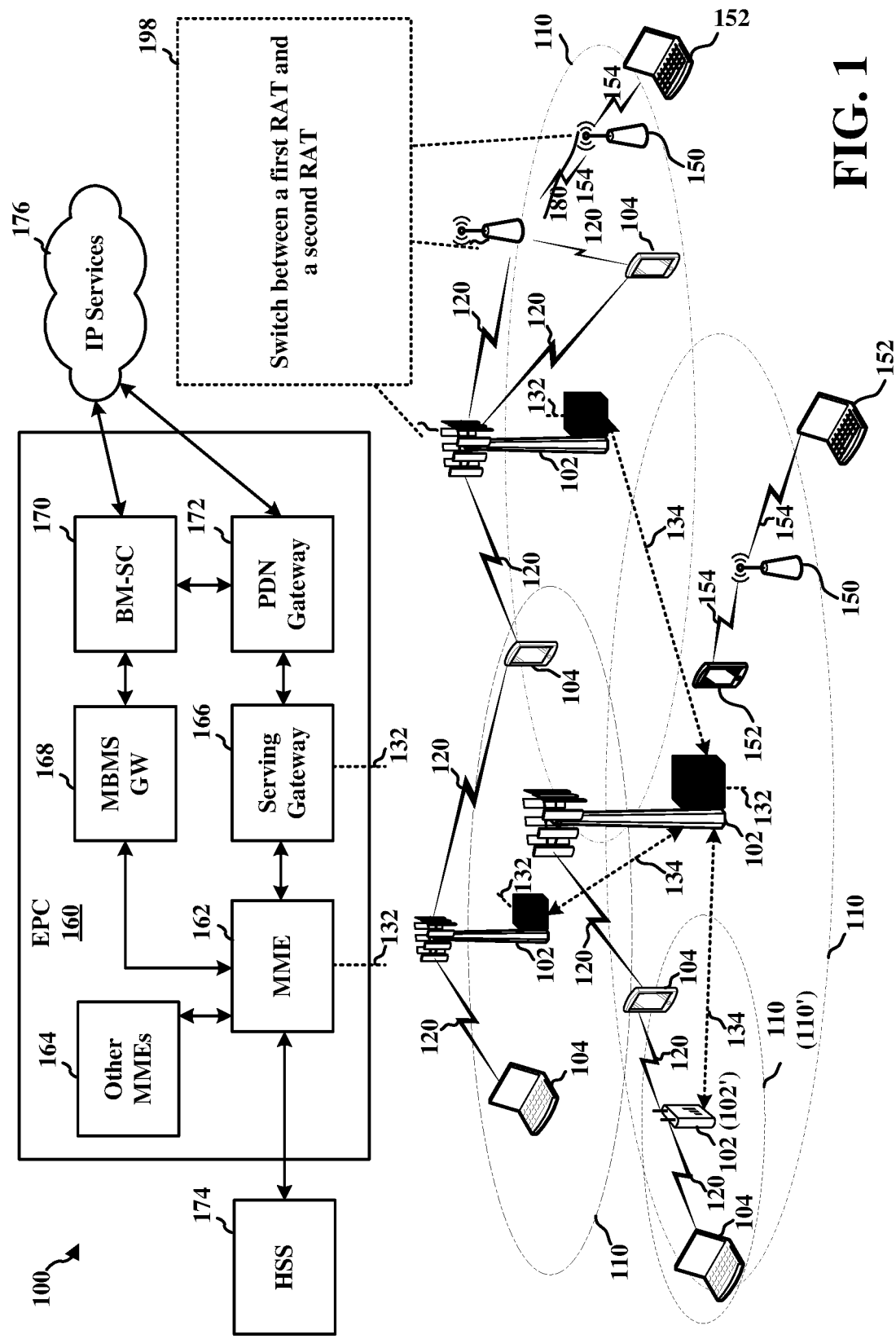
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the wireless communications system and access network 100 include at least one mission critical (MiCr) system 180. The MiCr system 180 may be, for example, a base station (e.g., a base station 102, a small cell 102', an eNB, a femto cell, a pico cell, etc.). The MiCr system 180 may be a MiCr controller and/or another MiCr device. In various aspects, the MiCr controller may be in communication with a base station 102 and/or a UE 104 via communication links 120. Such communication may occur in a licensed frequency band of one radio access technology (RAT) (e.g., LTE, LTE-A, etc.). The MiCr system 180 may further be in communication with one or more Wi-Fi APs 150 and/or Wi-Fi STAs 152, and communication therewith may occur in an unlicensed frequency band of another RAT (e.g., WiFi, Bluetooth, etc.).

In various aspects, the MiCr system 180 may be configured to switch 198 between a first frequency band associated with a first RAT (e.g., an unlicensed frequency band) and a second frequency band associated with a second RAT (e.g., a licensed frequency band). The MiCr system 180 may be configured to synchronize between the first band and the second band. In aspects, the MiCr system 180 may be configured to synchronize communication on the first and second bands based on transmission time intervals (TTIs). That is, the MiCr system 180 may adjust the length, start boundaries, and/or end boundaries of TTIs associated with either the first RAT and/or the second RAT such that the length, start boundaries, and end boundaries of TTIs associated with the first RAT and the length, start boundaries, and end boundaries of TTIs of the second RAT are aligned.

In various aspects, the MiCr system 180 may be configured to suspend traffic in either the first band or the second band so that MiCr communication may occur without interference from other devices. The MiCr system 180 may be configured to suspend traffic in a frequency band by transmitting a silencing signal to one or more devices operating in that frequency band. For example, the MiCr system 180 may suspend traffic in the licensed band by transmitting a silencing signal to at least one of a base station 102 and/or a UE 104.

Figure 2A:
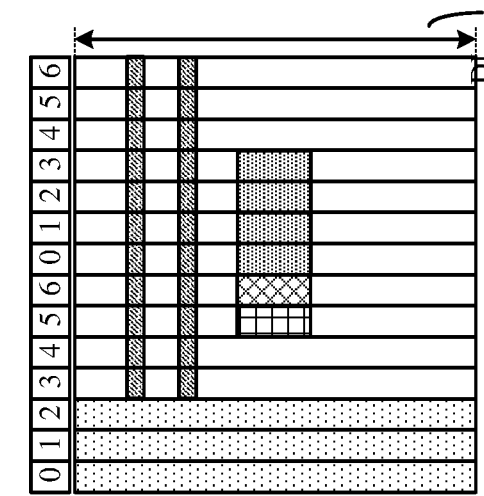
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2C:
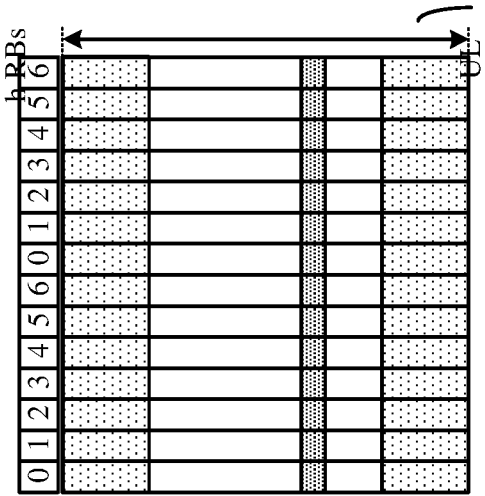
Figure 2B:
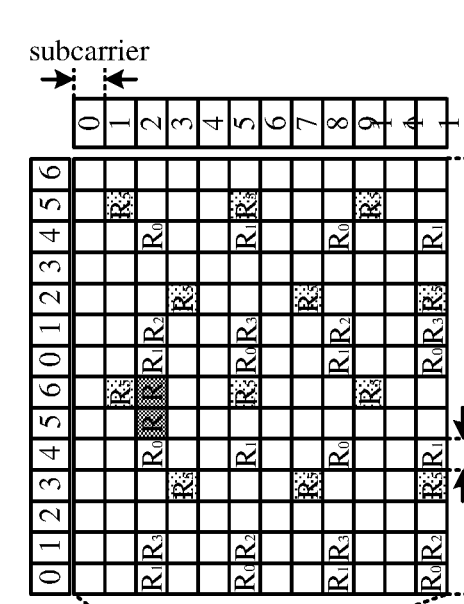
Figure 2D:
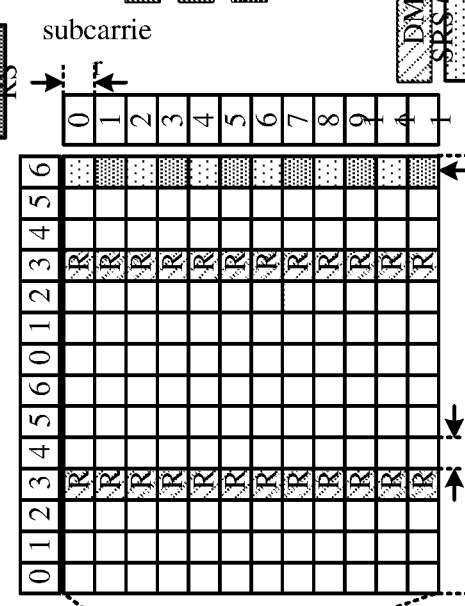

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
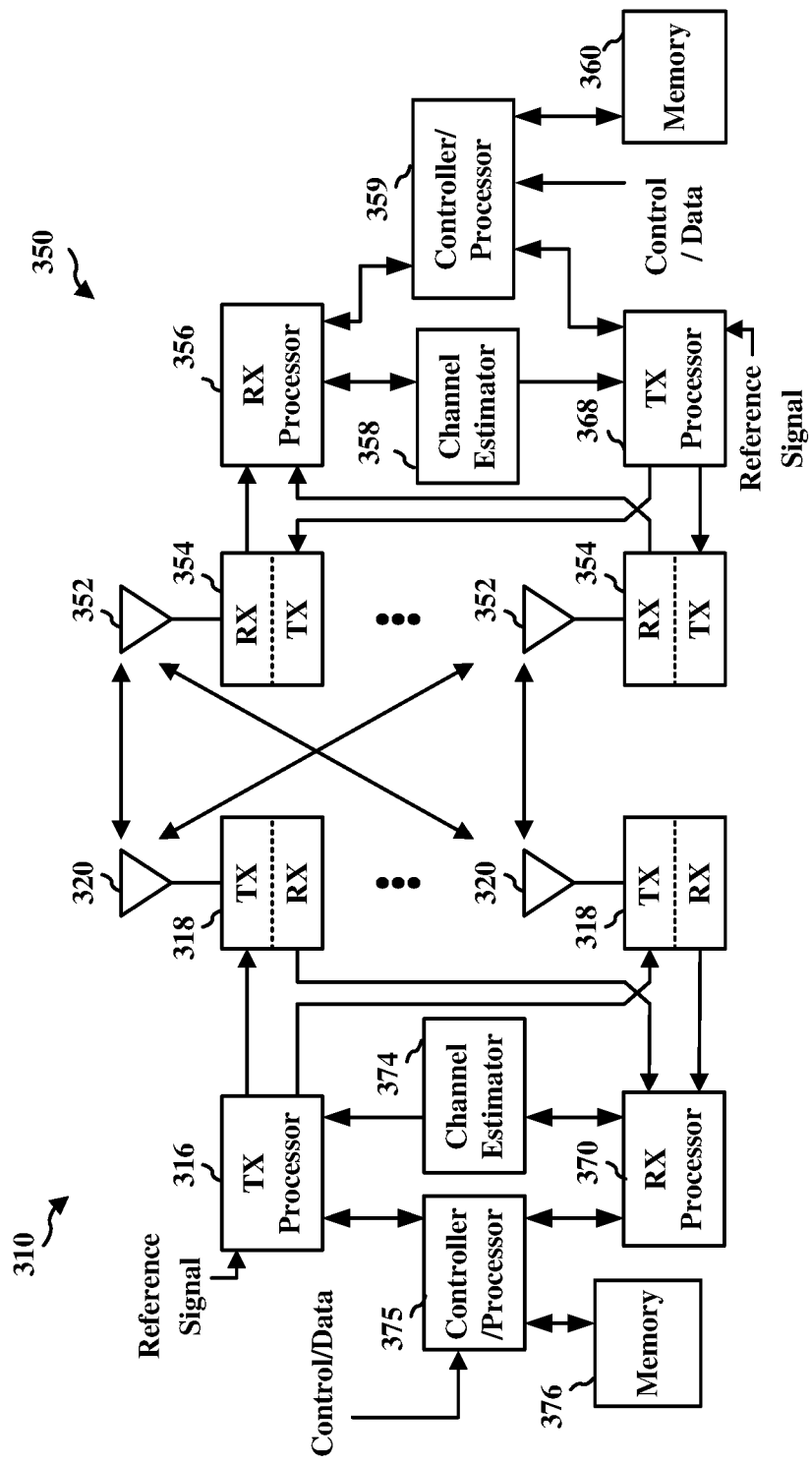
FIG. 3 is a diagram illustrating an example of a base station and user equipment (UE) in an access network.

FIG. 3 is a block diagram of an base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Various wireless technologies may be based on wireless sensor network (WSN) approaches and may provide communication at increased reliability (e.g., bit error rate (BER) at 10e-9) and decreased latency (e.g., 2 milliseconds (ms)). Such wireless communication may be referred to as "mission critical" (MiCr) communication. MiCr communication may occur in both licensed and unlicensed frequency bands. MiCr communication in unlicensed frequency bands may offer low-cost access and reduced complexity. For example, wireless algorithms, systems, and applications (WASA) wireless solutions for factory automation may use a Bluetooth-based technology that uses a 2.4 gigahertz (GHz) Industrial, Scientific, and Medical (ISM) unlicensed band. However, MiCr communication on an unlicensed frequency band (e.g., factory automation and process control) may be vulnerable to interference. For example, channel access for MiCr communication may fail if the unlicensed channel is occupied by other devices (e.g., WiFi devices, Bluetooth devices, etc.) that use the same unlicensed frequency band. In another example, MiCr communication may fail to achieve a desired QoS due to external interference (e.g., microwave interference).

In order to satisfy reliability and/or latency requirements commensurate with MiCr communication, MiCr communication may switch from an unlicensed spectrum to a licensed spectrum. In various aspects, MiCr communication that switches between unlicensed and licensed frequency bands may synchronize the communication based on transmission time intervals (TTIs), which may decrease the switching time to switch between bands. The amount of data encapsulated by higher layer protocols into frames (and subframes) for transmission on a radio link layer may be a function of the TTI. That is, the size of data blocks passed from a higher layer (e.g., a higher network layer) to a radio link layer may be determined by the TTI. In one aspect, a subframe may include two TTIs.

Figure 4:
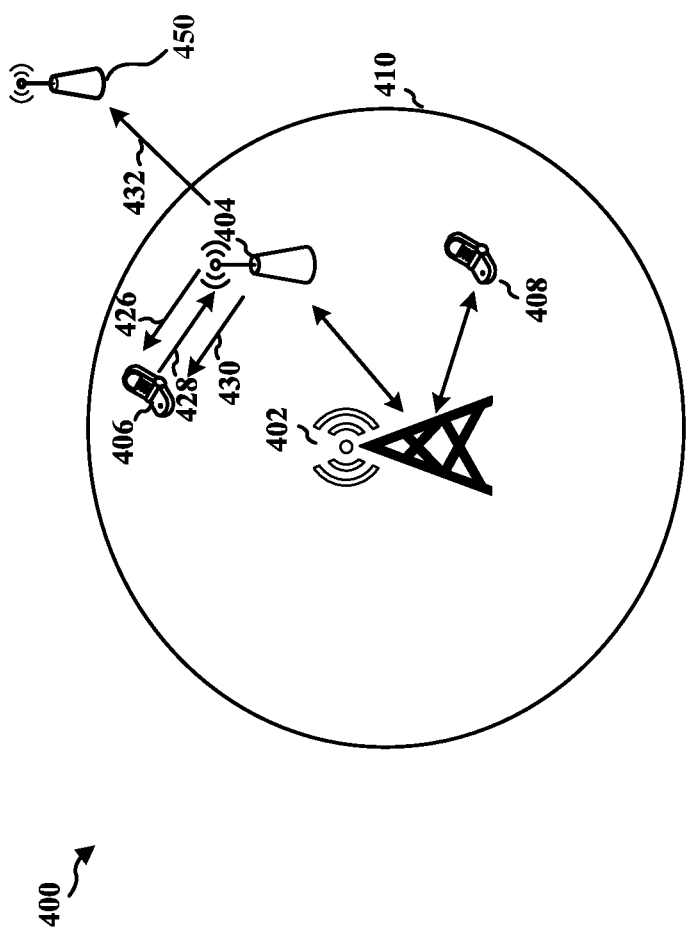
FIG. 4 is a diagram of a wireless communications system.

FIG. 4 is a diagram of a wireless communications system 400. The wireless communications system 400 includes a plurality of wireless communications devices 402, 404, 406, 408, 450. For example, the wireless communications system 400 may include a base station 402 and a UE 408, which may exchange uplink/downlink communications via a frequency band (or channel) of a RAT (e.g., a licensed frequency band of LTE or LTE-A). Additionally, the wireless communications system 400 may include at least one device configured to communicate via a different frequency band of a different RAT (e.g., an unlicensed frequency band of WiFi or Bluetooth), such as the WiFi AP 450.

The wireless communications system 400 may further include a controller 404 and a sensor 406, which may be associated with MiCr communications. In various aspects, the controller 404 may be configured to transmit packets to the sensor 406, for example, in association with MiCr communications. The controller 404 and the sensor 406 may be configured to communicate in both a first frequency band of a first RAT and a second frequency band of a second RAT. For example, the controller 404 and the sensor 406 may be configured to communicate in an unlicensed band of a first RAT (e.g., WiFi, Bluetooth, etc.) and may be additionally configured to communicate in a licensed band of a second RAT (e.g., LTE, LTE-A, a 5G RAT, etc.).

In various aspects, the controller 404 may be configured to synchronize TTIs associated with a first RAT with TTIs associated with a second RAT. For example, the controller 404 may be configured to synchronize TTIs associated with an unlicensed band with TTIs associated with a licensed band (although the controller 404 may synchronize TTIs associated with the licensed band with TTIs associated with the unlicensed band).

According to aspects, the controller 404 may be configured to determine synchronization between a first RAT and a second RAT based on TTIs associated with the first RAT and TTIs associated with the second RAT. In an aspect, the controller 404 may be configured to adjust one or more of a length, a start boundary, or an end boundary of TTIs associated with the first RAT to align with the corresponding one or more of a length, a start boundary, or and end boundary of TTIs associated with the second RAT. For example, the controller 404 may adjust a length of a TTI associated with the first RAT to match the length of a TTI associated with the second RAT. Thus, data encapsulated into frames (and subframes) at higher layers of the controller 404 may occupy the same number of equal sized TTIs for transmission whether the communication link uses the first RAT or the second RAT.

According to one aspect, the controller 404 may align a start boundary and/or an end boundary of a TTI associated with the first RAT with a start boundary and/or end boundary of a TTI associated with the second RAT. For example, the controller 404 may adjust the start and end boundaries of a first TTI associated with the first RAT to match the start and end boundaries of a second TTI associated with the second RAT. In an aspect, alignment of TTIs implies that start and end boundaries of TTIs are the same (or substantially similar)—i.e., that the length of TTIs are the same (or substantially similar).

In one aspect, the controller 404 may align TTIs of downlink subframes associated with the first RAT with TTIs of downlink subframes associated with the second RAT.

In another aspect, the controller 404 may adjust one TTI of downlink subframe associated with the first RAT to align with one TTI of an uplink subframe associated with the second RAT. That is, the controller 404 may synchronize the communication bands by aligning TTIs associated with the first RAT with TTIs associated with the second RAT, but which are offset by one TTI. For example, a downlink subframe of the first RAT may include two TTIs, the first of which may align with a TTI of a downlink subframe associated with the second RAT and the second of which may align with a TTI of an uplink subframe associated with the second RAT.

In another aspect, the controller 404 may synchronize the communication bands by adjusting TTIs of downlink subframes associated with the first RAT to align with TTIs associated with uplink subframes associated with the second RAT. Accordingly, the controller 404 may adjust the TTIs of uplink subframes associated with the first RAT to align with TTIs of downlink subframes associated with the second RAT.

In an aspect, the controller 404 may have data to be transmitted to the sensor 406. For example, the data may be associated with MiCr communication and, therefore, increased reliability and/or decreased latency may be needed. In aspect, the controller 404 may transmit at least a portion of the data as a first packet 426 using the first RAT (e.g., the controller 404 may transmit the first packet 426 in an unlicensed frequency band). In an aspect, the controller 404 may broadcast the first packet 426.

At the controller 404, a packet may be received in a random manner (e.g., at a random time)—e.g., packets are received by the physical (PHY) layer and/or media access control (MAC) from the higher layers at intervals that do not exactly correspond to TTI boundaries and, therefore, the controller 404 may be unable to transmit the packets immediately upon reception from the higher layers. In connection with switching between the first RAT and the second RAT, the controller 404 may synchronize TTIs associated with the first RAT with TTIs associated with the second RAT. For example, the controller 404 may synchronize TTIs associated with the unlicensed band with TTIs associated with the licensed band. Aligning TTIs may allow the controller 404 to decrease switching time when switching between the first RAT and the second RAT.

The controller 404 may perform a channel assessment of the first frequency band associated with the first RAT before transmitting the first packet 426. In an aspect, the controller 404 may perform a listen-before-talk (LBT) procedure on the first frequency band to determine that the first frequency band is available. Because a packet may be received by the from the higher layers at the controller 404 before a next TTI boundary, a reservation packet 432 may be broadcast to reserve the frequency band and reduce unpredictable access by neighboring devices, such as the WiFi AP 450. In various aspects, a duration for which the controller 404 reserves the first frequency band associated with the first RAT may be configurable, for example, by the higher layers (e.g., application layer) of the controller 404.

According to an aspect, the reservation packet 432 may comprise a clear-to-send (CTS) frame, which may conform to a wireless protocol, such as Institute of Electrical and Electronics Engineers (IEEE) 802.11. An example of the reservation packet 432 may be a Network Allocation Vector (NAV), which may be detected and decoded by WiFi devices, such as the WiFi AP 450.

In another aspect, the reservation packet 432 may be one or more packets that occupy the channel of the first RAT until a next TTI, at which point the controller 404 may transmit the first packet 426. In such an aspect, the content of the reservation packet 432 may be any content that causes the channel of the first RAT to be occupied—e.g., the reservation packet 432 may not include any data intended for a receiver.

The sensor 406 may receive the packet 426. However, due to interference and/or unsatisfactory QoS, the sensor 406 may transmit a negative acknowledgement (NAK) 428 to the controller 404. The NAK 428 may indicate that the sensor 406 was unable to decode the data included in the first packet 426.

In response to the NAK 428, the controller 404 may determine that the data should be retransmitted in a second packet 430. The controller 404 may switch to the second RAT to transmit the second packet 430. The controller 404 may switch to the second RAT after the synchronization between the first RAT and the second RAT. The controller 404 may then transmit the second packet 430 using the second RAT based on the switch from the first RAT to the second RAT. In an aspect, the controller 404 may send the second packet 430 via the first RAT and the second RAT to improve reliability.

In another aspect, the controller 404 may switch to the second RAT based on a channel assessment in the first RAT. For example, the controller 404 may determine that the first frequency band associated with the first RAT is occupied and, in response to the channel being occupied, the controller 404 may switch to the second RAT. In another aspect, the controller 404 may determine that channel conditions associated with the first RAT do not satisfy a QoS requirement (e.g., a value for a QoS metric fails to satisfy a threshold).

For example, the controller 404 may determine that transmitted packets using the first RAT are unsatisfactorily degraded and, in response, the controller 404 may switch to the second RAT.

In various aspects, the controller 404 may continue to monitor the first frequency band of the first RAT after the switch to the second RAT. When the controller 404 detects that the first frequency band of the first RAT is unoccupied, the controller 404 may switch from the second RAT to the first RAT.

Figure 5A:
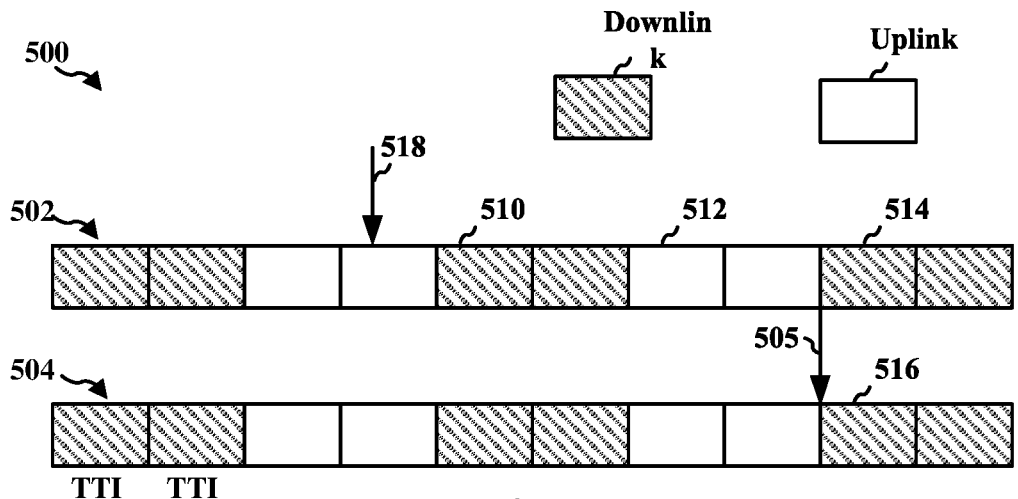
FIGS. 5A, 5B, and 5C are diagrams illustrating transmission time intervals associated with radio access technologies.
Figure 5B:
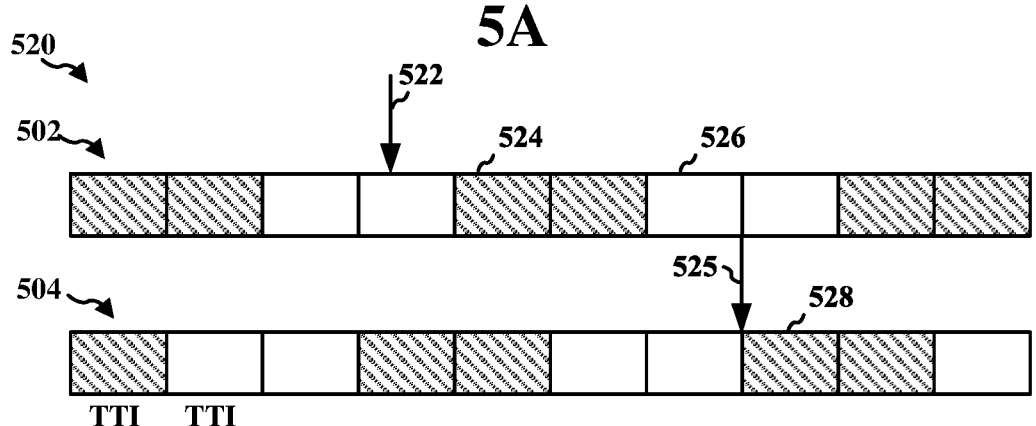
Figure 5C:
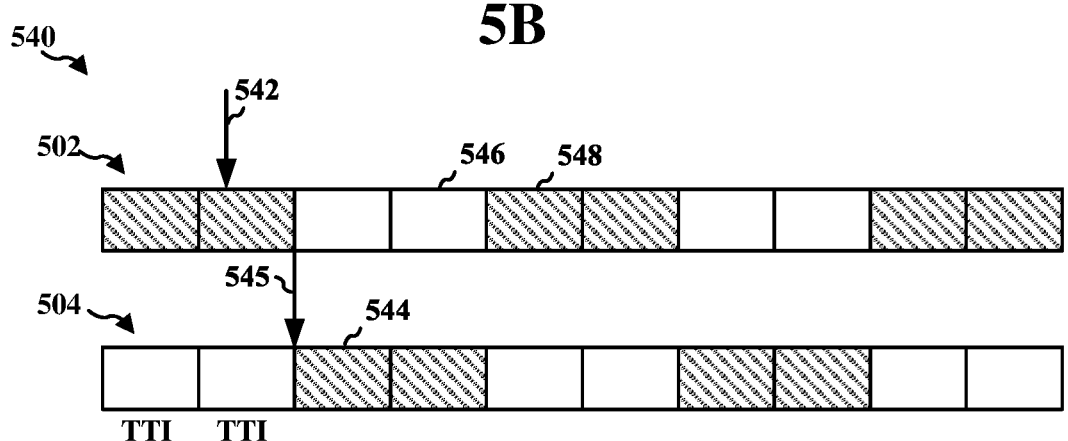

With reference to FIGS. 5A through 5C, three different aspects are illustrated for synchronizing communication between a first RAT and a second RAT based on TTIs associated with the first RAT and TTIs associated with the second RAT. In FIGS. 5A through 5C, the TTIs 502, 504 may be associated with either uplink or downlink communication. In the illustrated aspects, a subframe includes two (2) TTIs and, therefore, a downlink subframe includes two (2) downlink TTIs. However, other aspects are contemplated herein (e.g., a subframe may include a greater or fewer number of TTIs).

In various aspects, a wireless communications device (e.g., the controller 404 of FIG. 4) may be configured to synchronize TTIs associated with a first RAT with TTIs associate with a second RAT. For example, the wireless communications device may be configured to synchronize TTIs associated with an unlicensed band with TTIs associated with a licensed band.

According to aspects, the wireless communications device may be configured to determine synchronization between a first RAT and a second RAT based on TTIs 502 associated with the first RAT and TTIs 504 associated with the second RAT. In an aspect, the wireless communications device may be configured to adjust one or more of a length, a start boundary, or an end boundary of TTIs 502 associated with the first RAT to align with the corresponding one or more of a length, a start boundary, or and end boundary of TTIs 504 associated with the second RAT. For example, the wireless communications device may adjust a length of a TTI 502 associated with the first RAT to match the length of a TTI 504 associated with the second RAT. Thus, data encapsulated into frames (and subframes) at higher layers of the wireless communications device may have an equal duration for transmission whether the communication link uses the first RAT or the second RAT.

According to one aspect, the wireless communications device may determine that a start boundary and/or an end boundary of a TTI 502 associated with the first RAT should be aligned with a TTI 504 associated with the second RAT when switching a communication from one RAT to the other RAT. For example, the wireless communications device may adjust the start and end boundaries of a first TTI 502 associated with the first RAT to match the start and end boundaries of a second TTI 504 associated with the second RAT.

First with reference to FIG. 5A, an aspect 500 is illustrated in which TTIs 502 associated with first RAT are aligned with TTIs 504 associated with the second RAT. According to an aspect, a wireless communications device may synchronize TTIs 502 associated with a first RAT with TTIs 504 associated with a second RAT so that the length, start boundaries, and end boundaries of the TTIs 502 associated with the first RAT align with corresponding length, start boundaries, and end boundaries of the TTIs 504 associated with the second RAT. In the illustrated aspect, the TTIs 502, 504 are synchronized so that TTIs 502 associated with downlink subframes of the first RAT align with TTIs 504 associated with downlink subframes of the second RAT.

In an aspect, a packet 518 may be received from a higher layer of the wireless communications device. The wireless communications device may transmit the packet 518 at a first downlink TTI 510 of the TTIs 502 associated with the first RAT. In the context of FIG. 4, the controller 404 may transmit the first packet 426 to the sensor 406.

According to one aspect, the wireless communications device may receive a NAK at a first uplink TTI 512 of the TTIs 502 associated with the first RAT. In the context of FIG. 4, the controller 404 may receive the NAK 428 from the sensor 406.

In response to the NAK received at the first uplink TTI 512, the wireless communications device may perform a switch 505 from the first RAT to the second RAT. For example, the packet 518 may be associated with MiCr communications and, therefore, delivery of the packet 518 with increased reliability and decreased latency [global change] may be desirable. Thus, the wireless communications device may perform the switch 505 to the second RAT rather than wait for channel conditions associated with the first RAT to improve. In the context of FIG. 4, the controller 404 may switch from a first RAT to a second RAT.

Based on the switch 505, the wireless communications device may retransmit the packet 518 at a next downlink TTI 516 of the TTIs 504 associated with the second RAT. In an aspect, the wireless communications device may additionally retransmit the packet 518 at a next downlink TTI 514 of the TTIs 502 associated with the first RAT, for example, to improve reliable reception at a receiver. In the context of FIG. 4, the controller may transmit the second packet 430 using the second RAT and, optionally, may transmit the second packet 430 using the first RAT.

Next with reference to FIG. 5B, another aspect 520 is illustrated in which TTIs 502 associated with first RAT are aligned with TTIs 504 associated with the second RAT. According to an aspect, a wireless communications device may synchronize TTIs 502 associated with a first RAT with TTIs 504 associated with a second RAT so that the length, start boundaries, and end boundaries of the TTIs 502 associated with the first RAT align with corresponding length, start boundaries, and end boundaries of the TTIs 504 associated with the second RAT. In the illustrated aspect, the TTIs 502, 504 are synchronized so that TTIs 502 associated with the first RAT are offset by one TTI from TTIs 504 associated with the second RAT. In other words, for each two TTIs, two downlink TTIs of the TTIs 502 associated with the first RAT may be aligned with one downlink TTI and one uplink TTI of the TTIs 504 associated with the second RAT. Due to the offset in the synchronization of the TTIs of the first RAT with the TTIs of the second RAT, the switch 525 from the first RAT to the second RAT of FIG. 5B may allow for quicker retransmission of a packet than the switch 505 from the first RAT to the second RAT of FIG. 5A (e.g., by one TTI) because a next downlink TTI 528 for packet retransmission occurs sooner in the aspect 520 than a next downlink TTI 516 for packet retransmission in the aspect 500.

In an aspect, a packet 522 may be received by the PHY and/or MAC layer from a higher layer of the wireless communications device. The wireless communications device may transmit the packet 522 at a first downlink TTI 524 of the TTIs 502 associated with the first RAT. In the context of FIG. 4, the controller 404 may transmit the first packet 426 to the sensor 406.

According to one aspect, the wireless communications device may receive a NAK at a first uplink TTI 526 of the TTIs 502 associated with the first RAT. In the context of FIG. 4, the controller 404 may receive the NAK 428 from the sensor 406.

In response to the NAK received at the first uplink TTI 526, the wireless communications device may perform a switch 525 from the first RAT to the second RAT. For example, the packet 522 may be associated with MiCr communications and, therefore, expeditious and/or reliable delivery of the packet 522 may be of paramount importance. Thus, the wireless communications device may perform the switch 525 to the second RAT rather than wait for channel conditions associated with the first RAT to improve. In the context of FIG. 4, the controller 404 may switch from a first RAT to a second RAT.

Based on the switch 525, the wireless communications device may retransmit the packet 522 at a next downlink TTI 528 of the TTIs 504 associated with the second RAT. In the context of FIG. 4, the controller may transmit the second packet 430 using the second RAT.

Referring now to FIG. 5C, a third aspect 540 is illustrated in which uplink TTIs 502 associated with first RAT are aligned with downlink TTIs 504 associated with the second RAT. According to an aspect, a wireless communications device may synchronize TTIs 502 associated with a first RAT with TTIs 504 associated with a second RAT so that the length, start boundaries, and end boundaries of the TTIs 502 associated with the first RAT align with corresponding length, start boundaries, and end boundaries of the TTIs 504 associated with the second RAT. In the illustrated aspect, the TTIs 502, 504 are synchronized so that TTIs 502 associated with the first RAT are reversely synchronized with TTIs 504 associated with the second RAT. In other words, for each two TTIs, two downlink TTIs of the TTIs 502 associated with the first RAT may be aligned with two uplink TTIs of the TTIs 504 associated with the second RAT.

Due to the reverse synchronization, the switch 545 from the first RAT to the second RAT of FIG. 5C may allow for quicker retransmission of a packet than the switch 505 from the first RAT to the second RAT of FIG. 5A (e.g., by two TTIs) and/or the switch 525 from the first RAT to the second RAT of FIG. 5B (e.g., by one TTI) because the reverse synchronization allows the transmitting wireless communications device to behave as a frequency-division duplexing (FDD) system. As a packet arrives at the PHY and/or MAC layer from the higher layers at a random time, the third aspect 540 of FIG. 5C may allow the wireless communications device to transmit a packet on either the first RAT or the second RAT, depending on whether the next available downlink TTI is associated with the first RAT or the second RAT. Therefore, the aspect 540 of FIG. 5C may reduce latency (with a more frequent utilization of the second RAT).

In an aspect, a packet 542 may be received by the MAC and/or PHY layer from a higher layer of the wireless communications device. The wireless communications device may be transmitting packets via the first RAT. However, the packet 542 may arrive from the higher layer when the next TTI associated with the first RAT is an uplink TTI. To reduce latency in transmission of the packet 542 (e.g., the packet 542 may be an MiCr packet), the wireless communications device may perform a switch 545 from the first RAT to the second RAT. In the context of FIG. 4, the controller 404 may switch from a first RAT to a second RAT. Based on the switch 545 from the first RAT to the second RAT, the wireless communications device may transmit the packet 542 at a next downlink TTI 544 of the TTIs 504 associated with the second RAT. In the context of FIG. 4, the controller may transmit the second packet 430 using the second RAT.

Figure 6A:
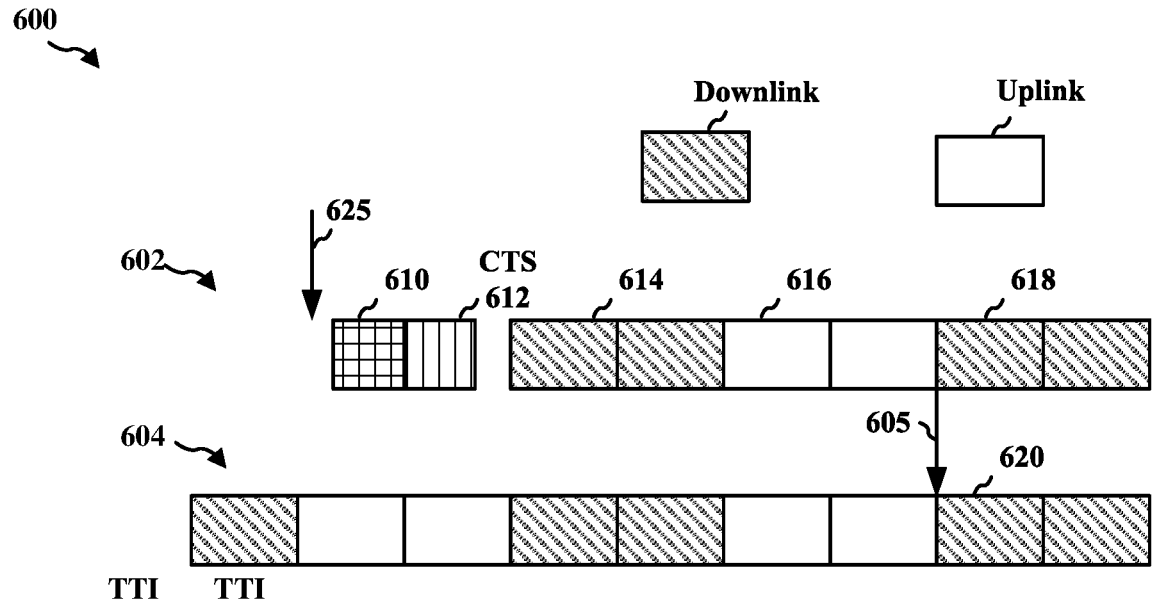
FIGS. 6A and 6B are diagrams illustrating channel access associated with radio access technologies.
Figure 6B:
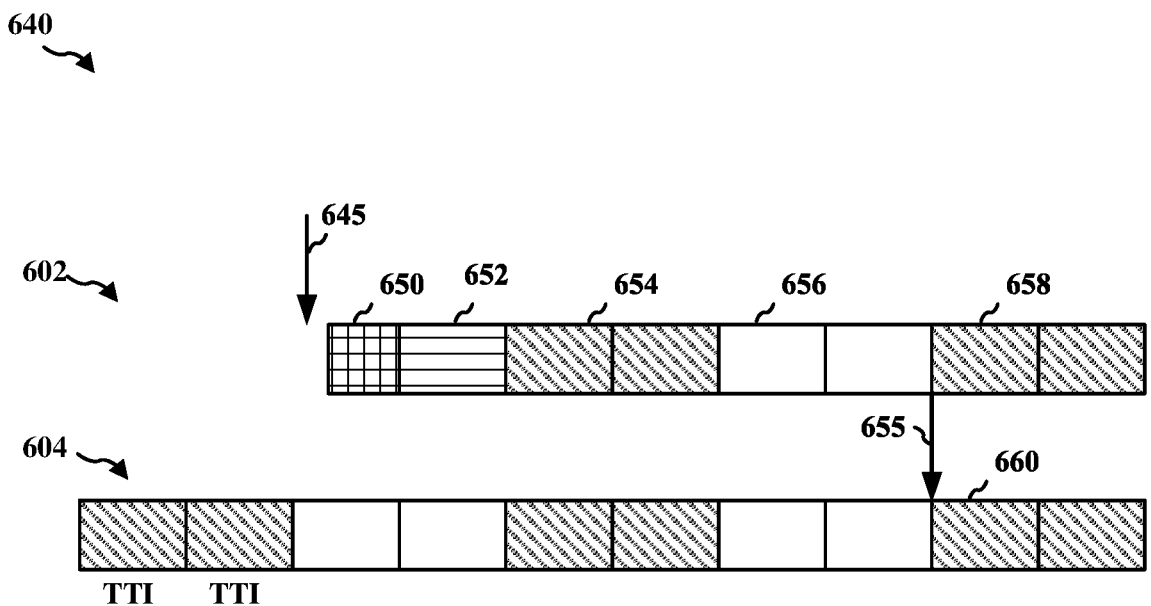

Turning now to FIGS. 6A and 6B, two aspects 600, 640 are illustrated for channel access associated with TTI synchronization of a first RAT and a second RAT. In FIGS. 6A and 6B, the TTIs 602, 604 may be associated with either uplink or downlink communication. In the illustrated aspects, subframes include two (2) TTIs and, therefore, a downlink subframe includes two (2) downlink TTIs. However, other aspects are contemplated herein (e.g., a subframe may include a greater or fewer number of TTIs).

In various aspects, a wireless communications device (e.g., the controller 404 of FIG. 4) may be configured to synchronize TTIs associated with a first RAT with TTIs associate with a second RAT. For example, the wireless communications device may be configured to synchronize TTIs associated with an unlicensed band with TTIs associated with a licensed band. FIGS. 6A and 6B illustrate an aspect in which TTIs 602, 604 are synchronized such that downlink TTIs 602 associated with a first RAT align with downlink TTIs 604 associated with a second RAT. However, other aspects are contemplated herein, such as where the TTIs 602, 604 are synchronized with an offset or where the TTIs 602, 604 are reversely synchronized.

In order to maintain synchronization between TTIs 602 associated with the first RAT and TTIs 604 associated with the second RAT, the wireless communications device may only begin data transmission on a synchronized TTI boundary. Because packets arrive at the MAC and/or PHY layer from a higher layer at random intervals, transmission of a packet may be delayed until the start of a next available downlink TTI. In an aspect, the wireless communications device may detect channel occupancy associated with the first RAT and, if the channel is available, may attempt to reserve the channel associated with the first RAT until a next available downlink TTI. In the context of FIG. 4, the controller 404 may perform an LBT procedure to determine if the WiFi AP 450 is occupying a channel of the first RAT.

First with reference to the aspect 600 of FIG. 6A, the wireless communications device may receive a packet 625 at the MAC and/or PHY layer from a higher layer. The packet 625 may arrive after the beginning of a TTI (rather than at the beginning of a TTI) and/or at an uplink TTI (e.g., so that downlink transmission is not to be performed by the wireless communications device). In order to determine if the channel of the first RAT is occupied, the wireless communications device may perform CCA (e.g., carrier sensing and/or energy detection) at the TTI 610 at which the packet 625 arrives. If CCA succeeds (e.g., the channel of the first RAT is determined to be available), the wireless communications device may transmit a CTS frame 612, for example, to prevent unpredictable access from neighboring devices communicating using the first RAT.

In the context of FIG. 4, the controller 404 may perform CCA of the channel of the first RAT to determine if the channel of the first RAT is occupied by the WiFi AP 450. If the controller 404 determines that the channel of the first RAT is available, the controller 404 may transmit the reservation packet 432 to reserve the channel of the first RAT until the next available downlink TTI 614 so that the packet 625 may be transmitted at the start of downlink TTI 614.

According to various aspects, the CTS frame 612 may be broadcast so that neighboring devices (e.g., neighboring devices communicating using the first RAT) may decode the CTS frame 612. The CTS frame 612 may include information associated with channel reservation for the first RAT. In one aspect, the CTS frame 612 may be or may include a NAV, which may be decodable by WiFi devices (e.g., the WiFi AP 450). In aspects, the duration for which the wireless communications device reserves the channel of the first RAT may be configurable (e.g., the duration of the channel reservation may be configured by a higher layer, such as an application layer).

The wireless communications device may transmit the packet 625 at a first downlink TTI 614 of the TTIs 602 associated with the first RAT. In the context of FIG. 4, the controller 404 may transmit the first packet 426 to the sensor 406.

According to one aspect, the wireless communications device may receive a NAK (e.g., a NAK associated with the packet 625) at a first uplink TTI 616 of the TTIs 602 associated with the first RAT. In the context of FIG. 4, the controller 404 may receive the NAK 428 from the sensor 406.

In response to the NAK received at the uplink TTI 616, the wireless communications device may perform a switch 605 from the first RAT to the second RAT. In the context of FIG. 4, the controller 404 may switch from a first RAT to a second RAT.

Based on the switch 605, the wireless communications device may retransmit the packet 625 at a next downlink TTI 620 of the TTIs 604 associated with the second RAT. In an aspect, the wireless communications device may additionally retransmit the packet 625 at a next downlink TTI 618 of the TTIs 602 associated with the first RAT, for example, to improve reliable reception at a receiver. In the context of FIG. 4, the controller may transmit the second packet 430 using the second RAT and, optionally, may transmit the second packet 430 using the first RAT.

Turning to FIG. 6B, the wireless communications device may receive a packet 645 from a higher layer. The packet 645 may arrive at during a TTI (rather than at the beginning of a TTI) and/or at an uplink TTI (e.g., so that downlink transmission is not to be performed by the wireless communications device). In order to determine if the channel of the first RAT is occupied, the wireless communications device may perform CCA (e.g., carrier sensing and/or energy detection) at the TTI 650 at which the packet 645 arrives. If CCA succeeds (e.g., the channel of the first RAT is determined to be available), the wireless communications device may transmit (e.g., broadcast) a reservation packet 652, for example, to prevent unpredictable access from neighboring devices communicating using the first RAT. In the aspect 640 of FIG. 6B, the reservation packet 652 may be at least one packet that is not intended for any receiver. Rather, the reservation packet 652 is intended to cause the channel of the first RAT to appear busy to neighboring devices (e.g., the WiFi AP 450). The at least one reservation packet 652 is transmitted until the beginning of a next downlink TTI 654, for example, to prevent a neighboring device from transmitting until the next downlink TTI 654 at which the packet 645 may be transmitted.

In the context of FIG. 4, the controller 404 may perform CCA of the channel of the first RAT to determine if the channel of the first RAT is occupied by a neighboring WiFi AP, e.g., WiFi AP 450. If the controller 404 determines that the channel of the first RAT is available, the controller 404 may transmit the reservation packet 432 to reserve the channel of the first RAT until the next available downlink TTI 654 so that the packet 645 may be transmitted thereat.

The wireless communications device may transmit the packet 645 at a first downlink TTI 654 of the TTIs 602 associated with the first RAT. In the context of FIG. 4, the controller 404 may transmit the first packet 426 to the sensor 406.

According to one aspect, the wireless communications device may receive a NAK (e.g., a NAK associated with the packet 645) at a first uplink TTI 656 of the TTIs 602 associated with the first RAT. In the context of FIG. 4, the controller 404 may receive the NAK 428 from the sensor 406.

In response to the NAK received at the first uplink TTI 656, the wireless communications device may perform a switch 655 from the first RAT to the second RAT. In the context of FIG. 4, the controller 404 may switch from a first RAT to a second RAT.

Based on the switch 655 from the first RAT to the second RAT, the wireless communications device may retransmit the packet 645 at a next downlink TTI 660 of the TTIs 604 associated with the second RAT. In an aspect, the wireless communications device may additionally retransmit the packet 645 at a next downlink TTI 658 of the TTIs 602 associated with the first RAT, for example, to improve reliable reception at a receiver. In the context of FIG. 4, the controller may transmit the second packet 430 using the second RAT and, optionally, may transmit the second packet 430 using the first RAT.

In FIGS. 6A and 6B, channel reservation (e.g., using the CTS frame 612 or the reservation packet 652) are illustrated as performed during uplink TTIs of TTIs 602 associated with the first RAT. Such an arrangement may allow for a quicker switch from downlink to uplink, for example, to reduce latency. In various aspects, a MAC-layer protocol with LBT (e.g., during downlink TTIs) may utilize either a wide-band polling-based scheme (e.g., ultra low latency (Ulolat) polling protocol) or a narrow-band frequency-division multiplexing (FDM)—based scheme (e.g., WASA protocol). In the context of FIG. 4, the controller 404 may perform CCA, reserve the channel of the first RAT and poll the sensor 406 associated with the controller 404 according to the scheduling policy of the controller 404. When polled, the sensor 406 may send an uplink packet via a wideband channel of the first RAT. In a narrow-band FDM-based scheme, the controller 404 may perform CCA, reserve the channel of the first RAT, and transmit downlink data to the sensor 406. The sensor 406 may multiplex uplink data for the controller 404 using FDM based on assigned grants from the controller 404. Subsequently, the sensor 406 may transmit the uplink data to the controller 404 via narrowband of the first RAT in a next subframe.

Figure 7:
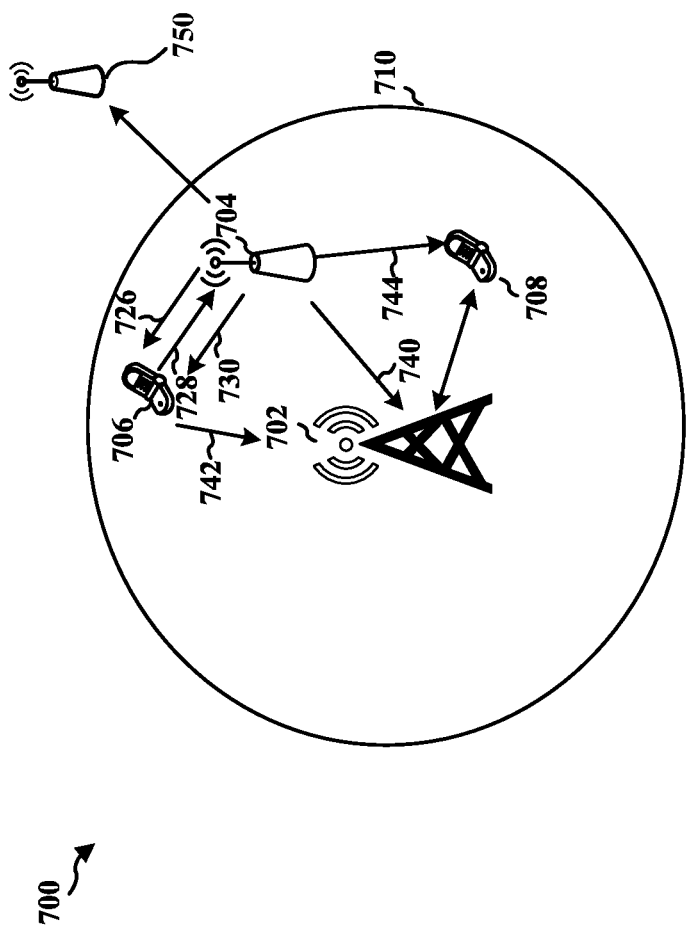
FIG. 7 is a diagram of a wireless communications system.

FIG. 7 is a diagram of a wireless communications system 700. The wireless communications system 700 includes a plurality of wireless communications devices 702, 704, 706, 708, 750. For example, the wireless communications system 700 may include a base station 702 and a UE 708, which may exchange uplink/downlink communications in a frequency band of a RAT (e.g., a licensed frequency band of LTE or LTE-A). Additionally, the wireless communications system 700 may include at least one device configured to communicate in a different frequency band of a different RAT (e.g., an unlicensed frequency band of WiFi or Bluetooth), such as the WiFi AP 750.

The wireless communications system 700 may further include a controller 704 and a sensor 706, which may be associated with MiCr communications. In various aspects, the controller 704 may be configured to transmit packets to the sensor 706, for example, in association with MiCr communications. The controller 704 and the sensor 706 may be configured to communicate in both a first frequency band of a first RAT and a second frequency band of a second RAT. For example, the controller 704 and the sensor 706 may be configured to communicate in an unlicensed band of a first RAT (e.g., WiFi, Bluetooth, etc.) and may be additionally configured to communicate in a licensed band of a second RAT (e.g., LTE, LTE-A, a 5G RAT, etc.). In an aspect, the controller 704 may be an aspect of the controller 404 and the sensor 706 may be an aspect of the sensor 406 illustrated in FIG. 4.

In various aspects, the controller 704 may be configured to synchronize TTIs associated with a first RAT with TTIs associated with a second RAT. For example, the controller 704 may be configured to synchronize TTIs associated with an unlicensed band with TTIs associated with a licensed band (although the controller 704 may synchronize TTIs associated with the licensed band with TTIs associated with the unlicensed band).

According to aspects, the controller 704 may be configured to determine synchronization between a first RAT and a second RAT based on TTIs associated with the first RAT and TTIs associated with the second RAT. In an aspect, the controller 704 may be configured to adjust one or more of a length, a start boundary, or an end boundary of TTIs associated with the first RAT to align with the corresponding one or more of a length, a start boundary, or and end boundary of TTIs associated with the second RAT. For example, the controller 704 may adjust a length of a TTI associated with the first RAT to match the length of a TTI associated with the second RAT. Thus, data encapsulated into frames (and subframes) at higher layers of the controller 704 may have an equal duration for transmission whether the communication link using the first RAT or the second RAT.

According to one aspect, the controller 704 may determine that a start boundary and/or an end boundary of a TTI associated with the first RAT aligns with a TTI associated with the second RAT. For example, the controller 704 may adjust the start and end boundaries of a first TTI associated with the first RAT to match the start and end boundaries of a second TTI associated with the second RAT.

In one aspect, the controller 704 may determine that TTIs of downlink subframes associated with the first RAT align with TTIs of downlink subframes associated with the second RAT. Accordingly, the controller 704 may determine that TTIs of uplink subframes associated with the first RAT align with TTIs of uplink subframes associated with the second RAT.

In another aspect, the controller 704 may determine that one TTI of downlink subframe associated with the first RAT aligns with one TTI of an uplink subframe associated with the second RAT. That is, the controller 704 may determine that TTIs associated with the first RAT are synchronized with TTIs associated with the second RAT, but may be offset by one TTI. For example, a downlink subframe of the first RAT may include two TTIs, the first of which may align with a TTI of a downlink subframe associated with the second RAT and the second of which may align with a TTI of an uplink subframe associated with the second RAT.

In another aspect, the controller 704 may determine that TTIs of downlink subframes associated with the first RAT align with TTIs associated with uplink subframes associated with the second RAT. Accordingly, the controller 704 may determine that TTIs of uplink subframes associated with the first RAT align with TTIs of downlink subframes associated with the second RAT.

In an aspect, the controller 704 may have a data to be transmitted to the sensor 706. For example, the data may be associated with MiCr communication and, therefore, may require relatively high reliability and/or low latency. In aspect, the controller 704 may transmit at least a portion of the data as a first packet 726 using the first RAT (e.g., the controller 704 may transmit the first packet 726 in an unlicensed frequency band). In an aspect, the controller 704 may broadcast the first packet 726.

At the controller 704, packets may arrive in a random manner—e.g., packets arrive from the higher layers at intervals that do not exactly correspond to TTI boundaries and, therefore, the controller 704 may be unable to transmit the packets immediately upon reception from the higher layers. In connection with switching between the first RAT and the second RAT, the controller 704 may synchronize TTIs associated with the first RAT with TTIs associated with the second RAT. For example, the controller 704 may synchronize TTIs associated with the unlicensed band with TTIs associated with the licensed band. Aligning TTIs may allow the controller 704 to switch relatively quickly between the first RAT and the second RAT.

The sensor 706 may receive the first packet 726. However, due to interference and/or unsatisfactory QoS, the sensor 706 may transmit a NAK 728 to the controller 704. The NAK 728 may indicate that the sensor 706 was unable to decode the data included in the first packet 726.

In response to the NAK 728, the controller 704 may determine that the data should be retransmitted in a second packet 730. The controller 704 may switch to the second RAT to transmit the second packet 730. The controller 704 may switch to the second RAT after the synchronization between the first RAT and the second RAT. The controller 704 may then transmit the second packet 730 using the second RAT based on the switch from the first RAT to the second RAT. According to an aspect, the controller 704 may send the second packet 730 using both the first RAT and the second RAT to improve reliability.

In another aspect, the controller 704 may switch to the second RAT based on channel assessment in the first RAT. For example, the controller 704 may determine that the first frequency band associated with the first RAT is occupied and, in response, the controller 704 may switch to the second RAT. In another aspect, the controller 704 may determine that channel conditions associated with the first RAT do not satisfy a predetermined threshold for a QoS metric. For example, the controller 704 may determine that received packets using the first RAT are unsatisfactorily degraded and, in response, the controller 704 may switch to the second RAT.

In various aspects, the QoS metric may include a signal-to-noise ratio (SNR), a bit error rate (BER), and/or block error rate (BLER). The controller 704 may measure a value for a QoS metric (e.g., an SNR value, a BER value, etc.) and may compare the value for the QoS metric to a predetermined threshold to determine whether the value satisfies that threshold. If the value for the QoS metric does not satisfy the predetermined threshold, the controller 704 may determine that communication should be switched from the first RAT to the second RAT.

In another aspect, the controller 704 may determine that a channel of the first RAT is occupied. For example, the controller 704 may perform an LBT procedure and/or CCA. If the WiFi AP 750 is communicating on the channel of the first RAT, the LBT procedure and/or CCA may fail. In response, the controller 704 may determine that communication should be switched from the first RAT to the second RAT.

In an aspect, the controller 704 may cause communication on the second RAT to be suspended, for example, to mitigate interference from the base station 702 and/or the UE 708 when the controller 704 transmits the second packet 730. Prior to transmission of the second packet 730, the controller 704 may transmit at least one silencing signal 740. In an aspect, the controller 704 may periodically transmit the silencing signal 740 for the duration that the controller 704 suspends communication in the frequency band of the second RAT—e.g., the controller 704 may transmit the first silencing signal 740 at each occurrence of the PUSCH (in the time domain). In another aspect, the controller 704 may transmit another signal indicating that communication in the frequency band of the second RAT may resume. In another aspect, the first silencing signal 740 may be associated with a predetermined duration, and communication in the second frequency band of the second RAT may resume at expiration of that predetermined duration.

In an aspect, the controller 704 may transmit the first silencing signal 740 on a physical uplink shared channel (PUSCH). In an aspect, the first silencing signal 740 may be carried on one-half off an ODFM symbol. For example, at least a portion of a resource in the second RAT may be reserved for sending a silencing signal and, when a silencing signal is detected, communication in the corresponding frequency band of the second RAT may be suspended. The first silencing signal 740 may be decodable by devices (e.g., at least the base station 702) communicating using the second frequency band of the second RAT.

In another aspect, the sensor 706 may transmit a second silencing signal 742. The second silencing signal 742 may be similar to or the same as the first silencing signal 740 transmitted by the controller 704. The controller 704 may not transmit the first silencing signal 740 in aspects in which the sensor 706 transmits the second silencing signal 742. In an aspect, the sensor 706 may periodically transmit the second silencing signal 742 for the duration communication is suspended in the second RAT—e.g., the sensor 706 may transmit the second silencing signal 742 at each occurrence of the PUSCH (in the time domain). In another aspect, the sensor 706 may transmit another signal indicating that communication in the second RAT may resume. In another aspect, the second silencing signal 742 may be associated with a predetermined duration, and communication in the second RAT may resume at expiration of that predetermined duration.

In an aspect, the sensor 706 may transmit the second silencing signal 742 on a PUSCH. In an aspect, the second silencing signal 742 may be carried on one-half off an ODFM symbol. For example, at least a portion of a resource in the second RAT may be reserved for silencing signal and, when a silencing signal is detected, communication via the second RAT may be suspended. The second silencing signal 742 may be decodable by devices (e.g., at least the base station 702) communicating using the second RAT.

According to various aspects, the sensor 706 may transmit the second silencing signal 742 based on a determination that communication with the controller 704 is to occur via the second RAT. In one aspect, the sensor 706 may switch to the second RAT based on channel assessment in the first RAT. For example, the sensor 706 may determine that the first frequency band associated with the first RAT is occupied and, in response, the sensor 706 may switch to the second RAT. In another aspect, the sensor 706 may determine that channel conditions associated with the first RAT do not satisfy a predetermined threshold for a QoS metric. For example, the sensor 706 may determine that transmitted packets using the first RAT are unsatisfactorily degraded and, in response, the sensor 706 may switch to the second RAT (additionally, the sensor 706 may transmit the NAK 728 to the controller 704).

In various aspects, the QoS metric may include a SNR, a BLER, and/or a BER. The sensor 706 may measure a value for a QoS metric (e.g., an SNR value, a BER value, etc.) and may compare the value for the QoS metric to a predetermined threshold to determine whether the value satisfies (e.g., meets or exceeds) that threshold. If the value for the QoS metric does not satisfy the predetermined threshold, the sensor 706 may determine that communication should be switched from the first RAT to the second RAT.

In another aspect, the sensor 706 may determine that a channel or frequency band of the first RAT is occupied. For example, the sensor 706 may perform an LBT procedure and/or CCA. If the WiFi AP 750 is communicating on the channel of the first RAT, the LBT procedure and/or CCA may fail. In response, the sensor 706 may determine that communication should be switched from the first RAT to the second RAT.

In various aspects, the base station 702 may monitor at least one resource of the second RAT that is reserved for silencing signals. The base station 702 may detect the first silencing signal 740 or the second silencing signal 742. In response, the base station 702 may suspend communication via the second RAT. The base station 702 may resume communication using the second RAT after a predetermined period of time (e.g., an amount of time indicated by the first silencing signal 740 or the second silencing signal 742) or after reception of another signal from the controller 704 or the sensor 706 indicating that the base station 702 may resume communication using the second RAT.

Based on the first silencing signal 740 or the second silencing signal 742, the base station 702 may cause the UE 708 to suspend communication via the second RAT. In one aspect, the base station 702 may not schedule the UE 708 so that the UE 708 has no uplink resource grant for uplink communication. For example, the base station 702 may mute communication on a physical downlink control channel (PDCCH) to the UE 708 (e.g., by not scheduling uplink grants).

In another aspect, the controller 704 may transmit a third silencing signal 744. The third silencing signal 744 may be similar to or the same as the first silencing signal 740. In an aspect, the controller 704 may periodically transmit the third silencing signal 744 for the duration that the controller 704 suspends communication via the second RAT—e.g., the controller 704 may transmit the third silencing signal 744 at each occurrence of the PUSCH (in the time domain). In another aspect, the controller 704 may transmit another signal indicating that communication in the second RAT may resume. In another aspect, the third silencing signal 744 may be associated with a predetermined duration, and communication in the second RAT may resume at expiration of that predetermined duration.

In an aspect, the controller 704 may transmit the third silencing signal 744 on a PUSCH. In an aspect, the third silencing signal 744 may be carried on one-half off an ODFM symbol. For example, at least a portion of a resource in the second RAT may be reserved for silencing signals and, when a silencing signal is detected, communication via the second RAT may be suspended (e.g., by devices that are not communicating MiCr data). The third silencing signal 744 may be decodable by devices (e.g., at least the UE 708) communicating using the second RAT.

In various aspects, the UE 708 may monitor at least one resource of the second RAT that is reserved for silencing signals. The UE 708 may detect the third silencing signal 744. In response, the UE 708 may suspend communication via the second RAT. The UE 708 may resume communication using the second RAT after a predetermined period of time (e.g., an amount of time indicated by the third silencing signal 744) or after reception of another signal from the controller 704 indicating that the UE 708 may resume communication using the second RAT.

After transmission of at least the first silencing signal 740, the controller 704 may transmit the second packet 730 via the second RAT. The controller 704 may begin transmission of the second packet 730 at the start of a downlink TTI associated with the second RAT, which may be synchronized with a TTI associated with the first RAT.

In various aspects, the controller 704 may continue to monitor the first frequency band of the first RAT after the switch to the second RAT. When the controller 704 detects that the first frequency band of the first RAT is unoccupied, the controller 704 may switch communication from the second RAT to the first RAT.

Figure 8:
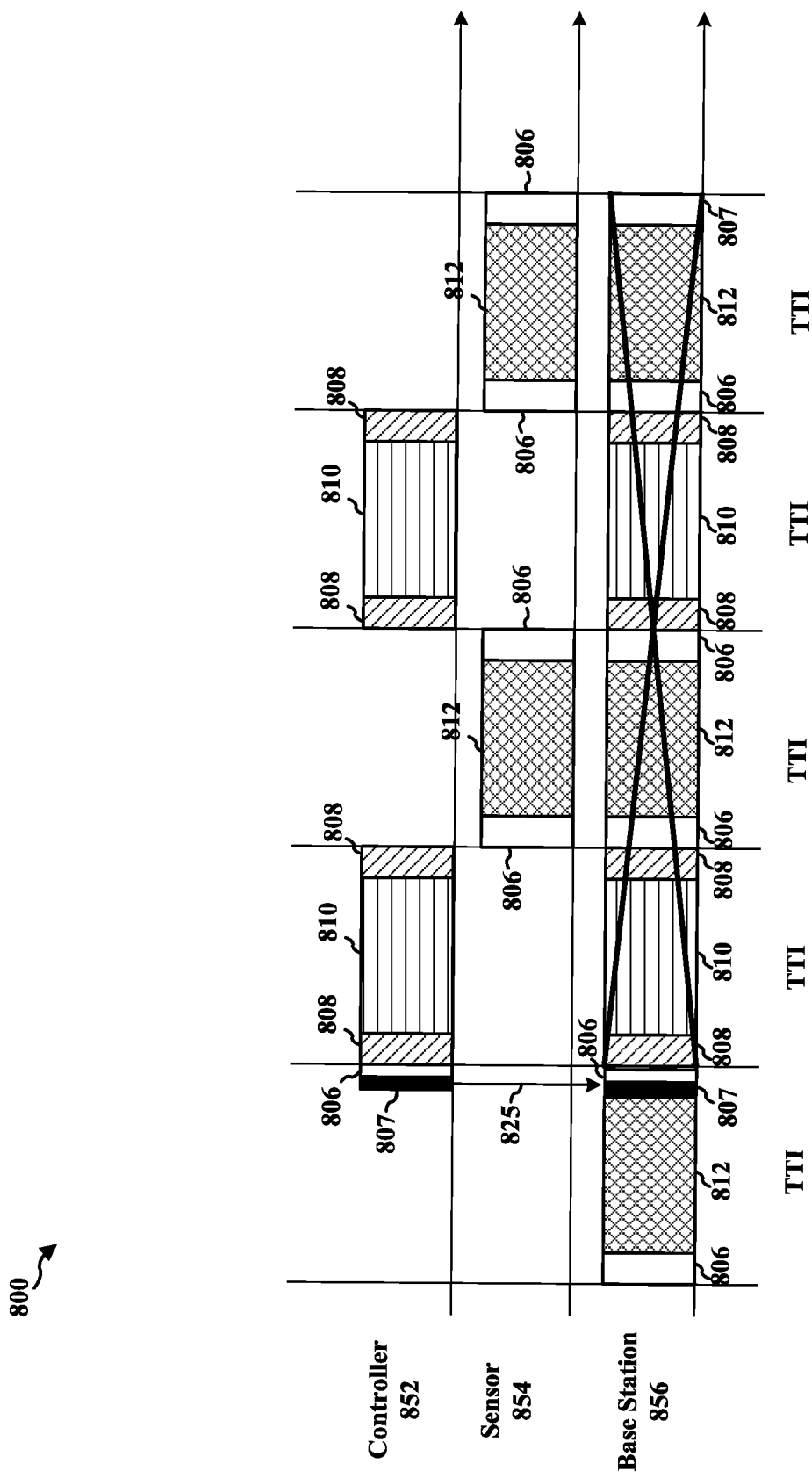
FIG. 8 is a diagram of channels of a radio access technology.

With reference to FIG. 8, a block diagram illustrates an aspect for silencing communication in a RAT 800. According to an aspect, the RAT may be a licensed RAT, such as LTE, LTE-A, a 5G RAT, or the like. In the context of FIG. 7, the controller 852 may be an aspect of the controller 704, the sensor 854 may be an aspect of the sensor 706, and the base station 856 may be an aspect of the base station 702.

As illustrated, the RAT 800 may include resources that are associated with a plurality of channels 808, 810, 812. For example, the RAT may include at least a PDCCH 808, a PDSCH 810, and a PUSCH 812. In an aspect, the channels 808, 810, 812 may include a gap 806. A gap 806 may allow a wireless communications device to switch between uplink communication and downlink communication (e.g., to switch between transmitting on an uplink using a transmitter and receiving on a downlink using a receiver, respectively). For example, the gap 806 may allow the base station 856 to switch from a receiver for the PUSCH 812 to a transmitter for the PDCCH 808 and PDSCH 810. Prior to the gap 806 following the PUSCH 812, at least one resource 807 may be reserved for silencing signals.

In an aspect, the controller 852 may receive a packet at a lower layer from a higher layer (e.g., a packet associated with MiCr communication) and, based on the packet, the controller 852 may cause communication via the RAT 800 to be suspended. To suspend communication over the RAT 800, the controller 852 may transmit a silencing signal 825 on at least one reserved resource 807. In an aspect, the at least one resource 807 may be included in a PUSCH 812. According to an aspect, the silencing signal 825 may be one-half of an OFDM symbol carried on the at least one resource 807. In an aspect, the controller 852 may transmit the silencing signal 825 on the first one-half symbol of the at least one resource 807, while the gap 806 following the at least one reserved resource 807 and the PUSCH 812 may allow the base station 856 to transition from uplink to downlink (e.g., from receiver to transmitter).

According to aspects, the base station 856 may monitor the at least one resource 807 to detect a silencing signal. When the controller 852 transmits the silencing signal 825, the base station 856 may detect the silencing signal 825 based on monitoring the at least one resource 807. Based on detecting the silencing signal 825, the base station 856 may suspend communication over the second RAT. For example, the base station 856 may refrain from transmitting data on at least a PDCCH and/or a PDSCH.

In addition to the base station suspending downlink communication, the base station 856 may be responsible for suspending communication by a UE (e.g., the UE 708 of FIG. 7). To that end, the base station 856 may refrain from scheduling uplink resource grants to a UE and, therefore, the UE may lack any resources on which to transmit uplink data. As illustrated in FIG. 8, the base station 856 refrains from transmitting data on a plurality of occurrences of the PDCCH 808 and the PDSCH 810 following reception of the silencing signal 825. Further, because the base station 856 does not schedule any resources for uplink communication from one or more UEs (e.g., the base station 856 may mute the PDCCH 808), the base station 856 may not receive any data carried on the PUSCH 812 following reception of the silencing signal 825. Consequently, communication is suspended over the RAT 800 by the base station 856 and one or more UEs operating in a cell provided by the base station 856.

Figure 9:
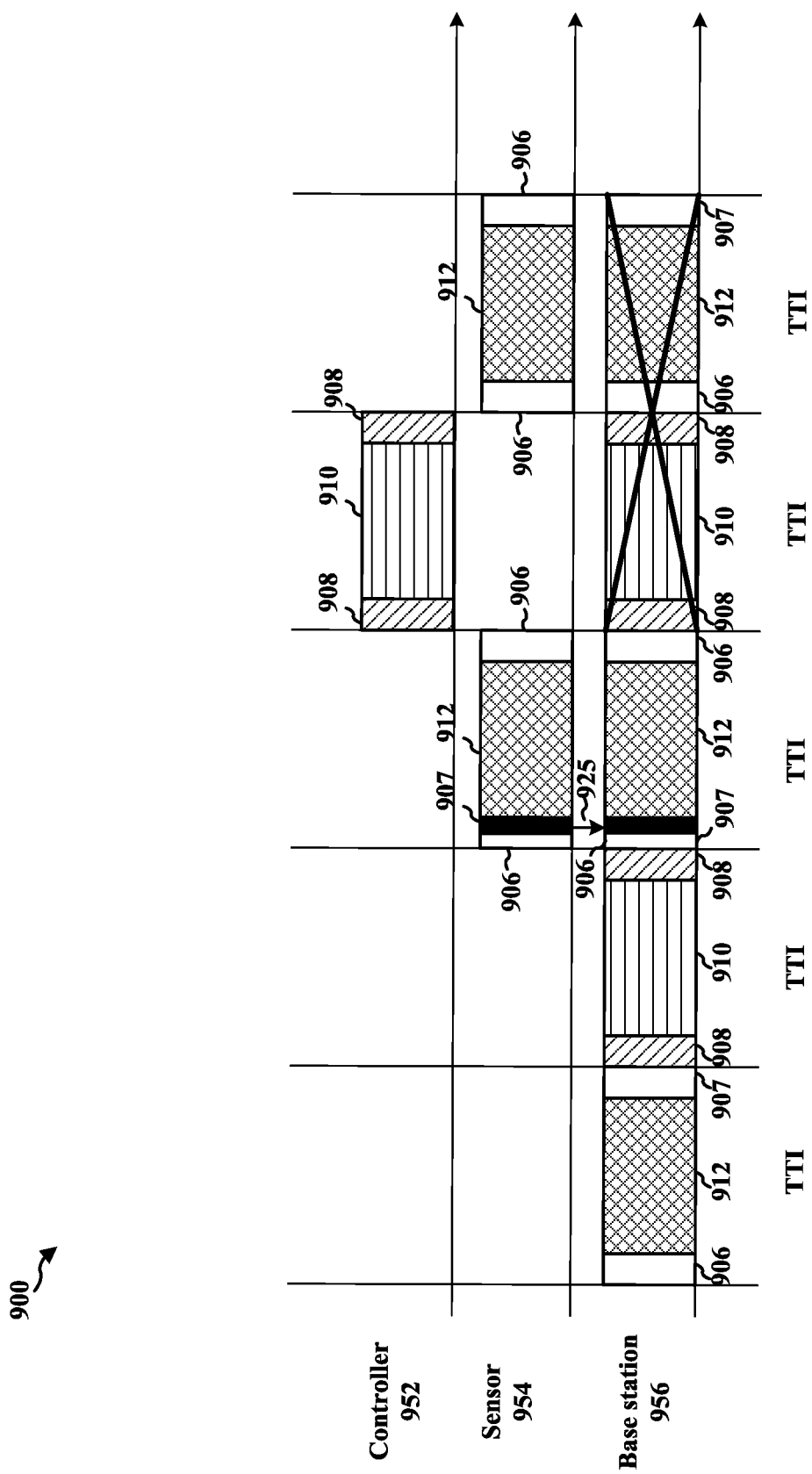
FIG. 9 is a diagram of channels of a radio access technology.

Turning to FIG. 9, a block diagram illustrates a second aspect for silencing communication via a RAT 900. According to an aspect, the RAT may be a licensed RAT, such as LTE, LTE-A, a 5G RAT, or the like. In the context of FIG. 7, the controller 952 may be an aspect of the controller 704, the sensor 954 may be an aspect of the sensor 706, and the base station 956 may be an aspect of the base station 702.

As illustrated, the RAT 900 may include resources that are associated with a plurality of channels 908, 910, 912. For example, the RAT may include at least a PDCCH 908, a PDSCH 910, and a PUSCH 912. In an aspect, the channels 908, 910, 912 may include a gap 906. A gap 906 may allow a wireless communications device to switch between uplink and downlink (e.g., to switch between a receiver and a transmitter, respectively). For example, the gap 906 may allow the base station 956 to switch from a receiver for the PUSCH 912 to a transmitter for the PDCCH 908 and PDSCH 910. Following the gap 906 preceding the PUSCH 912, at least one resource 907 may be reserved for silencing signals.

In an aspect, the sensor 954 may receive a packet (e.g., a packet associated with MiCr communication from the controller 952 and/or from a higher layer of the sensor 954) and, based on the packet, the sensor 954 may cause communication via the RAT 900 to be suspended. To suspend communication over the RAT 900, the sensor 954 may transmit a silencing signal 925 on at least one reserved resource 907. In an aspect, the at least one resource 907 may be included in a PUSCH 912. According to an aspect, the silencing signal 925 may be one-half of an OFDM symbol carried on the at least one resource 907. In an aspect, the sensor 954 may transmit the silencing signal 925 on the second one-half symbol of the at least one resource 907, while the gap 906 preceding the at least one reserved resource 907 may allow the base station 856 to transition from downlink communication to uplink communication (e.g., from transmitter to receiver).

According to aspects, the base station 956 may monitor the at least one resource 907 for silencing signals. When the sensor 954 transmits the silencing signal 925, the base station 956 may detect the silencing signal 925 based on monitoring the at least one resource 907. Based on detecting the silencing signal 925, the base station 956 may suspend communication. For example, the base station 956 may refrain from transmitting data on at least a PDCCH and/or a PDSCH.

In addition to the base station 956 suspending downlink communication, the base station 956 may be responsible for suspending communication by a UE (e.g., the UE 708 of FIG. 7). To that end, the base station 956 may refrain from scheduling uplink resource grants to a UE and, therefore, the UE may lack resources on which to transmit uplink data. As illustrated in FIG. 9, the base station 956 refrains from transmitting data on occurrences of the PDCCH 808 and the PDSCH 810 following reception of the silencing signal 925. Further, because the base station 956 does not schedule any resources for uplink communication from one or more UEs (e.g., the base station 956 may mute the PDCCH 908), the base station 956 may not receive any data carried on the PUSCH 912 (from a UE) following reception of the silencing signal 925. Consequently, communication is suspended over the RAT 900 for the base station 956 and one or more UEs operating in a cell provided by the base station 956.

Figure 10:
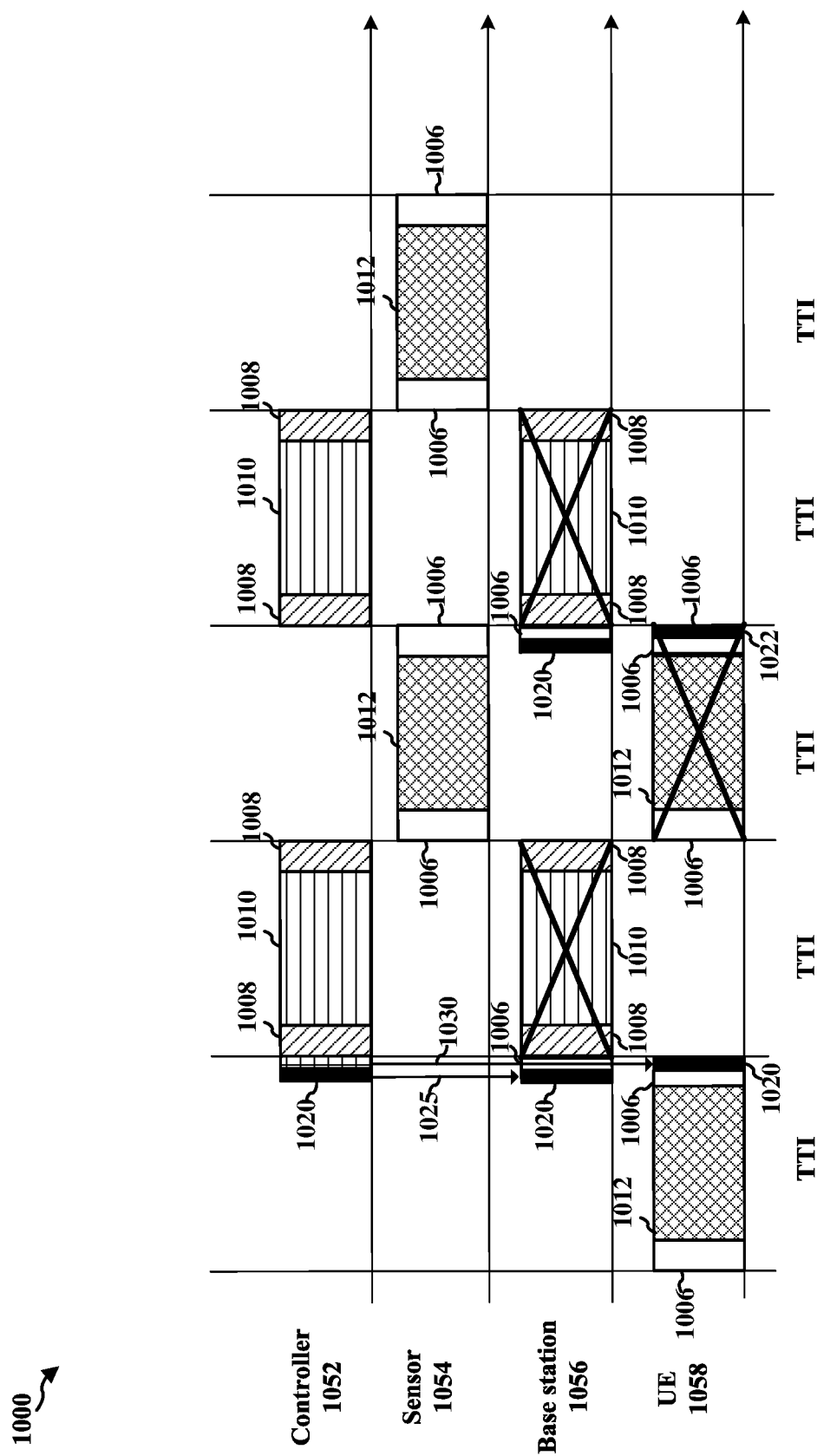
FIG. 10 is a diagram of channels of a radio access technology.

With reference to FIG. 10, a block diagram illustrates a third aspect for silencing communication on a RAT 1000. According to an aspect, the RAT may be a licensed RAT, such as LTE, LTE-A, a 5G RAT, or the like. In the context of FIG. 7, the controller 1052 may be an aspect of the controller 704, the sensor 1054 may be an aspect of the sensor 706, the base station 1056 may be an aspect of the base station 702, and the UE 1058 may be an aspect of the UE 708.

As illustrated, the RAT 1000 may include resources that are associated with a plurality of channels 1008, 1010, 1012. For example, the RAT may include at least a PDCCH 1008, a PDSCH 1010, and a PUSCH 1012. In an aspect, the channels 1008, 1010, 1012 may include a gap 1006. A gap 1006 may allow a wireless communications device to switch between uplink and downlink communication (e.g., to switch between a receiver and a transmitter, respectively). For example, the gap 1006 may allow the base station 1056 to switch from a receiver for the PUSCH 1012 to a transmitter for the PDCCH 1008 and PDSCH 1010.

In aspects, the controller 1052 may not observe the gap, such as the gap following the PUSCH 1012 and preceding the PDCCH 1008. Rather, at least one resource occurring during the gap 1006 observed at the base station 1056 and UE 1058 may be reserved for silencing signals. For example, the at least one resource 1020 preceding the PDCCH 1008 may be reserved for silencing signals for base stations and silencing signals for UEs. In an aspect, the at least one reserved resource 1020 may be included in a PUSCH 812.

In an aspect, the controller 1052 may receive, at a lower layer, a packet from a higher layer (e.g., a packet associated with MiCr communication) and, based on the packet, the controller 1052 may cause communication using the RAT 1000 to be suspended. To suspend communication in the RAT 1000, the controller 1052 may transmit silencing signals 1025, 1030 on the at least one reserved resource 1020. According to an aspect, the silencing signals 1025, 1030 may each be one-half of an OFDM symbol carried on the at least one reserved resource 1020.

In an aspect, the controller 1052 may transmit the first silencing signal 1025 on the first one-half symbol of the at least one resource 1020. In an aspect, the controller 1052 may transmit the second silencing signal 1030 on the other one-half symbol of the at least one resource 1020.

According to aspects, the base station 1056 may monitor the at least one resource 1020 for silencing signals. When the controller 1052 transmits the silencing signal 1025, the base station 1056 may detect the silencing signal 1025 based on monitoring the at least one resource 1020. Based on detecting the silencing signal 1025, the base station 1056 may suspend communication. For example, the base station 1056 may refrain from transmitting data on at least a PDCCH and/or a PDSCH.

According to aspects, the UE 1058 may monitor the at least one resource 1020 for silencing signals. When the controller 1052 transmits the silencing signal 1030, the UE 1058 may detect the silencing signal 1030 based on monitoring the at least one resource 1020. Based on detecting the silencing signal 1030, the UE 1058 may suspend communication. For example, the UE 1058 may refrain from transmitting data on at least a PUSCH 1012.

Figure 11:
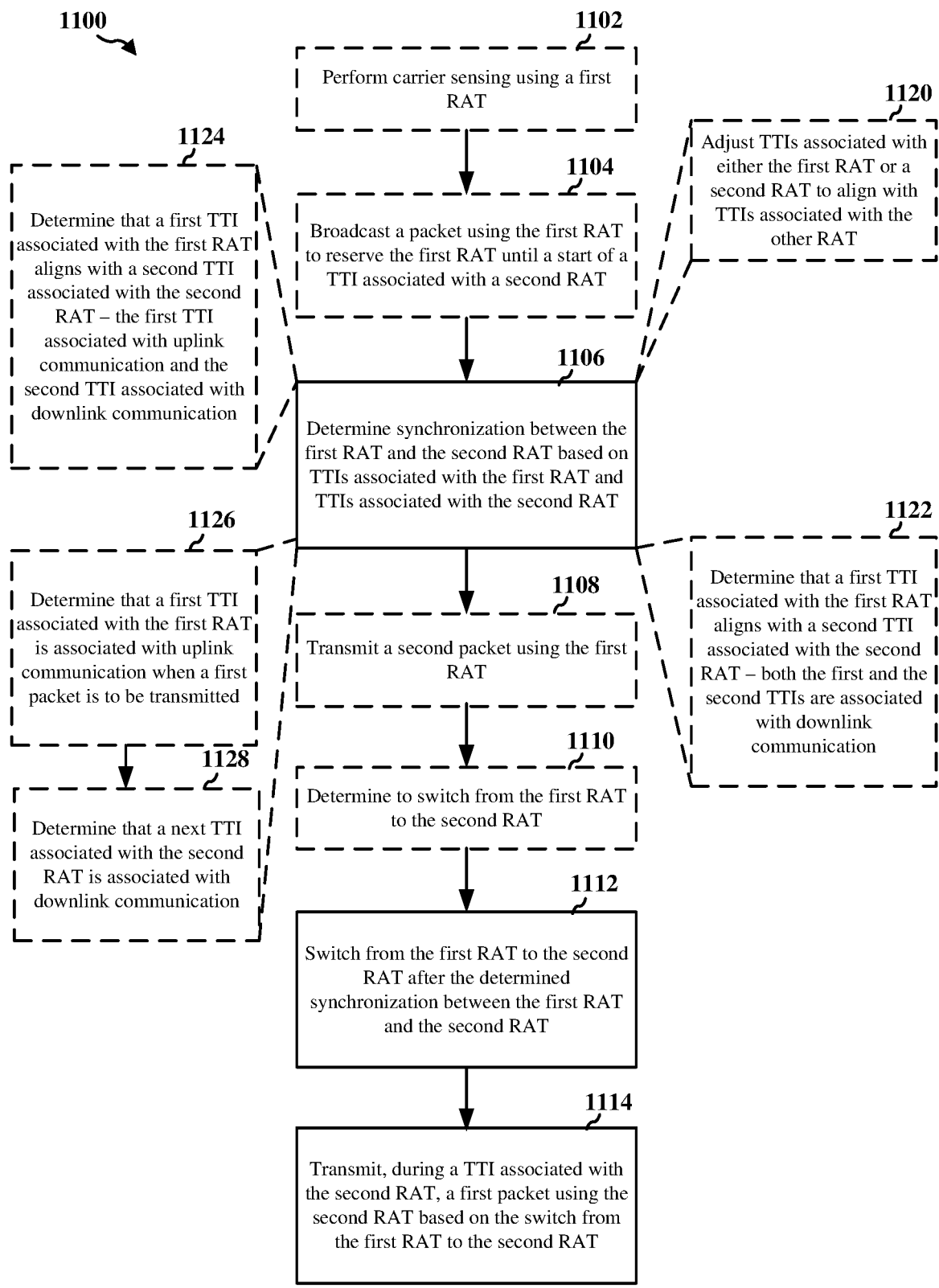
FIG. 11 is a flowchart of a method of wireless communication.

FIG. 11 is a flowchart of a method 1100 of wireless communication. The method may be performed by a controller (e.g., the controller 404, the apparatus 1502/1502'). In FIG. 11, various operations are illustrated as optional (e.g., denoted by dashed lines). However, the present disclosure contemplates operations in which one or more operations of the method 1100 are optional, omitted, and/or alternatively performed according to various aspects. Further, one or more operations of the method 1100 may be transposed and/or contemporaneously performed.

The method 1100 may begin with an operation 1102 in which a controller may perform carrier sensing using a first RAT. In the context of FIG. 4, the controller 404 may perform carrier sensing, for example, by performing a clear channel assessment of the first frequency band associated with the first RAT.

At operation 1104, the controller may transmit (e.g., broadcast) a packet using the first RAT to reserve the first RAT until a start of a TTI associated with a second RAT. In the context of FIG. 4, the controller 404 may broadcast the reservation packet 432.

At operation 1106, the controller may determine synchronization between the first RAT and the second RAT based on TTIs associated with the first RAT and TTIs associated with the second RAT. For example, the controller may synchronize communications over the first RAT and second RAT by aligning the TTIs associated with first RAT and TTIs associated with the second RAT. In the context of FIG. 4, the controller 404 may determine synchronization between the first RAT and the second RAT based on TTIs associated with the first RAT and TTIs associated with the second RAT.

In one aspect, operation 1106 may include operation 1120. At operation 1120, the controller may adjust TTIs associated with either the first RAT or the second RAT to align with TTIs associated with the other one of the first RAT or the second RAT. In the context of FIG. 4, the controller 404 may adjust TTIs associated with either the first RAT or the second RAT to align with TTIs associated with the other one of the first RAT or the second RAT.

In one aspect, operation 1106 may include operation 1122. At operation 1122, the controller may determine that a first TTI associated with the first RAT aligns with a second TTI associated with the second RAT. According to one aspect, both the first and second TTIs are associated with downlink communication. In the context of FIG. 4, the controller 404 may determine that a first TTI associated with the first RAT aligns with a second TTI associated with the second RAT, wherein both the first and the second TTIs are associated with downlink communication.

In one aspect, operation 1106 may include operation 1124. At operation 1124, the controller may determine that a first TTI associated with the first RAT aligns with a second TTI associated with the second RAT. According to one aspect, the first TTI is associated with uplink communication and the second TTI is associated with downlink communication.

In the context of FIG. 4, the controller 404 may determine that a first TTI associated with the first RAT aligns with a second TTI associated with the second RAT, wherein the first TTI is associated with uplink communication and the second TTI is associated with downlink communication.

In one aspect, operation 1106 includes operation 1126 and/or operation 1128. At operation 1126, the controller may determine that a first TTI associated with the first RAT is associated with uplink communication when a first packet is to be transmitted. In the context of FIG. 4, the controller 404 may determine that a first TTI associated with the first RAT is associated with uplink communication when a first packet is to be transmitted.

At operation 1128, the controller may determine that a next TTI associated with the second RAT is associated with downlink communication. In the context of FIG. 4, the controller 404 may determine that a next TTI associated with the second RAT is associated with downlink communication.

At operation 1108, the controller may transmit a second packet using the first RAT. In the context of FIG. 4, the controller 404 may transmit the second packet 430 using both the first RAT, for example, before the switch to the second RAT in order to improve reliability.

At operation 1110, the controller may determine to switch from the first RAT to the second RAT. For example, the controller may receive a NAK associated with a previously transmitted packet. Alternatively, the controller may determine that carrier sensing (e.g., according to operation 1102) fails (e.g., because a channel of the first RAT is occupied). Alternatively, the controller may determine that a value of a QoS metric associated with the first RAT fails to satisfy a threshold.

In the context of FIG. 4, the controller 404 may determine to switch from the first RAT to the second RAT. For example, the controller 404 may receive the NAK 428 associated with the first packet 426. Alternatively, the controller 404 may determine that carrier sensing for the first RAT fails (e.g., because a channel of the first RAT is occupied). Alternatively, the controller 404 may determine that a value of a QoS metric associated with the first RAT fails to satisfy a threshold.

At operation 1112, the controller may switch from the first RAT to the second RAT after the determined synchronization between the first RAT and the second RAT. In one aspect, the controller may switch from the first RAT to the second RAT based on operation 1110. In another aspect, the controller may switch from the first RAT to the second RAT based on operations 1126, 1128 (e.g., because a next downlink TTI available to the controller occurs in the second RAT). In the context of FIG. 4, the controller 404 may switch from the first RAT to the second RAT after the determined synchronization between the first RAT and the second RAT.

At operation 1114, the controller may transmit, during a TTI associated with the second RAT, a first packet using the second RAT based on the switch from the first RAT to the second RAT. In the context of FIG. 4, the controller 404 may transmit, during a TTI associated with the second RAT, the second packet 430 using the second RAT based on the switch from the first RAT to the second RAT.

Figure 12:
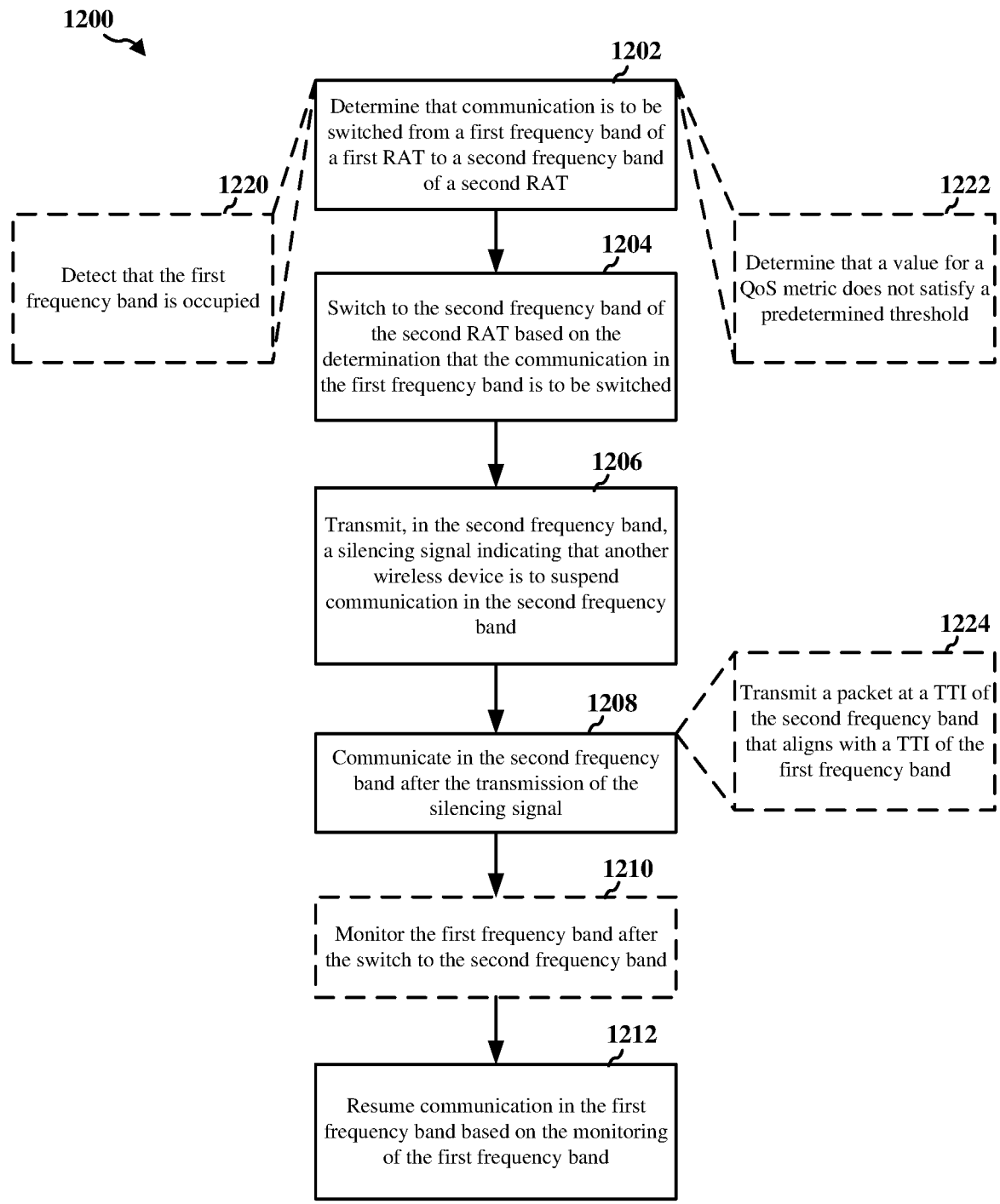
FIG. 12 is a flowchart of a method of wireless communication.

FIG. 12 is a flowchart of a method 1200 of wireless communication. The method may be performed by a controller (e.g., the controller 704, the apparatus 1502/1502'). In FIG. 12, various operations are illustrated as optional (e.g., denoted by dashed lines). However, the present disclosure contemplates operations in which one or more operations of the method 1200 are optional, omitted, and/or alternatively performed according to various aspects. Further, one or more operations of the method 1200 may be transposed and/or contemporaneously performed.

The method 1200 may begin with an operation 1202 in which a controller may determine that communication is to be switched from a first frequency band of a first RAT to a second frequency band of a second RAT. In the context of FIG. 7, the controller 704 may determine that that communication is to be switched from a first frequency band of a first RAT to a second frequency band of a second RAT.

In one aspect, operation 1202 may include operation 1220. At operation 1220, the controller may determine that the first frequency band is occupied. For example, the controller may perform carrier sensing. In the context of FIG. 7, the controller 704 may perform carrier sensing for the first frequency band of the first RAT.

In one aspect, operation 1202 may include operation 1222. At operation 1222, the controller may determine that a value for a QoS metric for the first frequency band does not satisfy a predetermined threshold. In the context of FIG. 7, the controller 704 may determine that a value for a QoS metric for the first frequency band does not satisfy a predetermined threshold.

At operation 1204, the controller may switch to the second frequency band of the second RAT based on the determination that the communication in the first frequency band is to be switched. In the context of FIG. 7, the controller 704 may switch to the second frequency band of the second RAT based on the determination that the communication in the first frequency band is to be switched.

At operation 1206, the controller may transmit, in the second frequency band, a silencing signal indicating that another wireless device is to suspend communication in the second frequency band. In an aspect, the controller may periodically transmit silencing signals. In the context of FIG. 7, the controller 704 may transmit the first silencing signal 740 and/or the third silencing signal 744. Alternatively or additionally, the controller 704 may cause the sensor 706 to transmit the second silencing signal 742.

At operation 1208, the controller may communicate via the second frequency band after the transmission of the silencing signal. In the context of FIG. 7, the controller 704 may transmit, via the second frequency band, the second packet 730, e.g., after reception of the NAK 728 associated with the first packet 726.

In an aspect, operation 1208 may include operation 1224. At operation 1224, the controller may transmit a packet at a TTI of the second frequency band that aligns with a TTI of the first frequency band. In the context of FIG. 7, the controller 704 may transmit, in the second frequency band, the second packet 730 at a TTI of the second frequency band that aligns with a TTI of the first frequency band.

At operation 1210, the controller may monitor the first frequency band after the switch to the second frequency band. For example, the controller may perform carrier sensing in the first frequency band. In the context of FIG. 7, the controller 704 may monitor the first frequency band after the switch to the second frequency band.

At operation 1212, the controller may resume communication in the first frequency band based on the monitoring of the first frequency band. For example, if the controller determines that a channel of the first frequency band is unoccupied, the controller may resume communication in the first frequency band. In the context of FIG. 7, the controller 704 may resume communication in the first frequency band based on the monitoring of the first frequency band.

Figure 13:
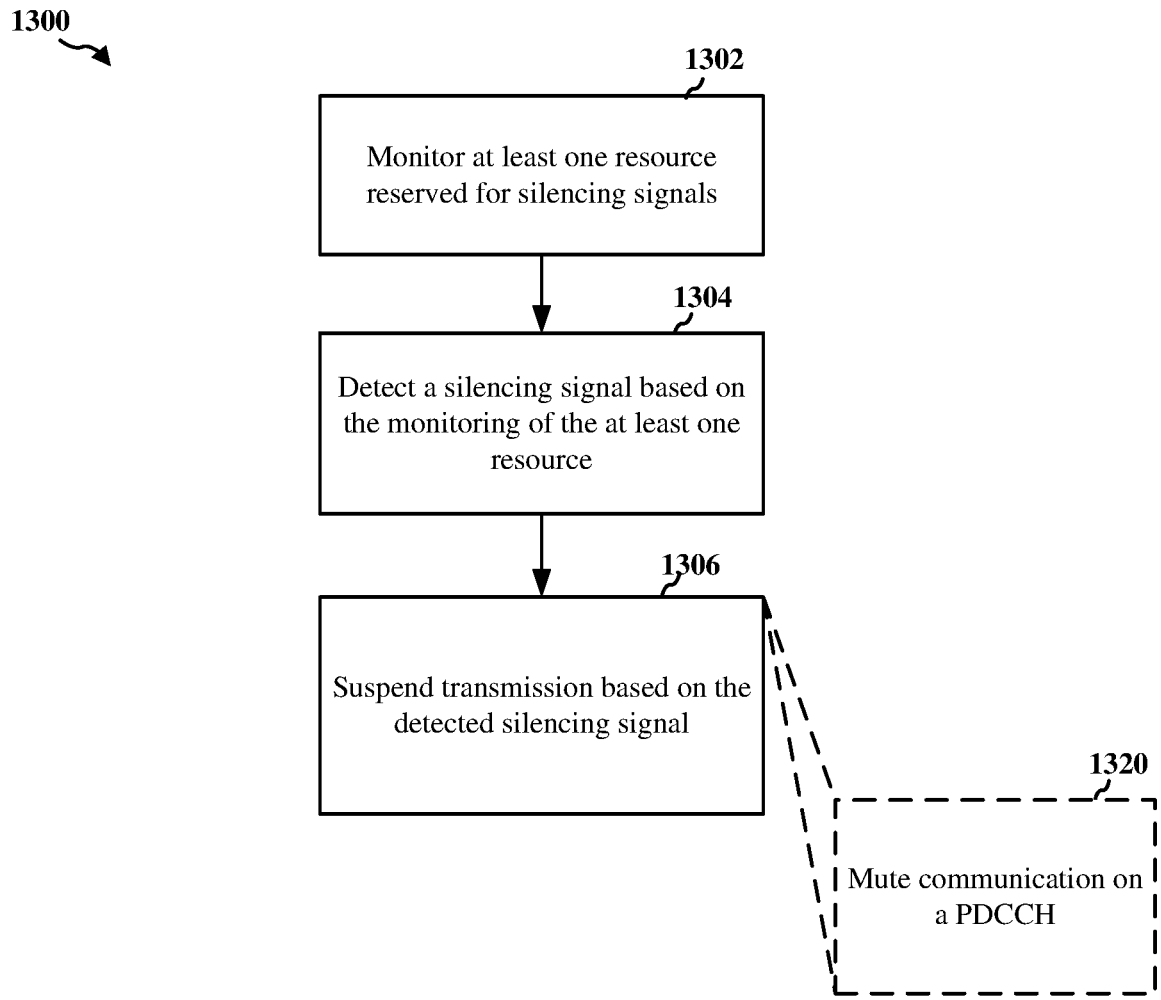
FIG. 13 is a flowchart of a method of wireless communication.

FIG. 13 is a flowchart of a method 1300 of wireless communication. The method may be performed by a base station (e.g., the base station 702, the apparatus 1602/1602'). In FIG. 13, various operations are illustrated as optional (e.g., denoted by dashed lines). However, the present disclosure contemplates operations in which one or more operations of the method 1300 are optional, omitted, and/or alternatively performed according to various aspects. Further, one or more operations of the method 1300 may be transposed and/or contemporaneously performed.

The method 1300 may begin with operation 1302. At operation 1302, a base station may monitor at least one resource reserved for silencing signals. In the context of FIG. 7, the base station 702 may monitor at least one resource reserved for silencing signals.

At operation 1304, the base station may detect a silencing signal based on the monitoring of the at least one resource. In the context of FIG. 7, the base station 702 may detect the silencing signal 740 and/or the silencing signal 742.

At operation 1306, the base station may suspend transmission based on the detected silencing signal. In the context of FIG. 7, the base station 702 may suspend transmission (e.g., to the UE 708) based on the detected silencing signal 740 and/or the detected silencing signal 742.

In an aspect, operation 1306 includes an operation 1320. At operation 1320, the base station may mute communication on a PDCCH, which may cause a UE to suspend communication. In the context of FIG. 7, the base station 702 may mute communication on a PDCCH (e.g., by not scheduling uplink grants), which may cause the UE 708 to suspend communication.

Figure 14:
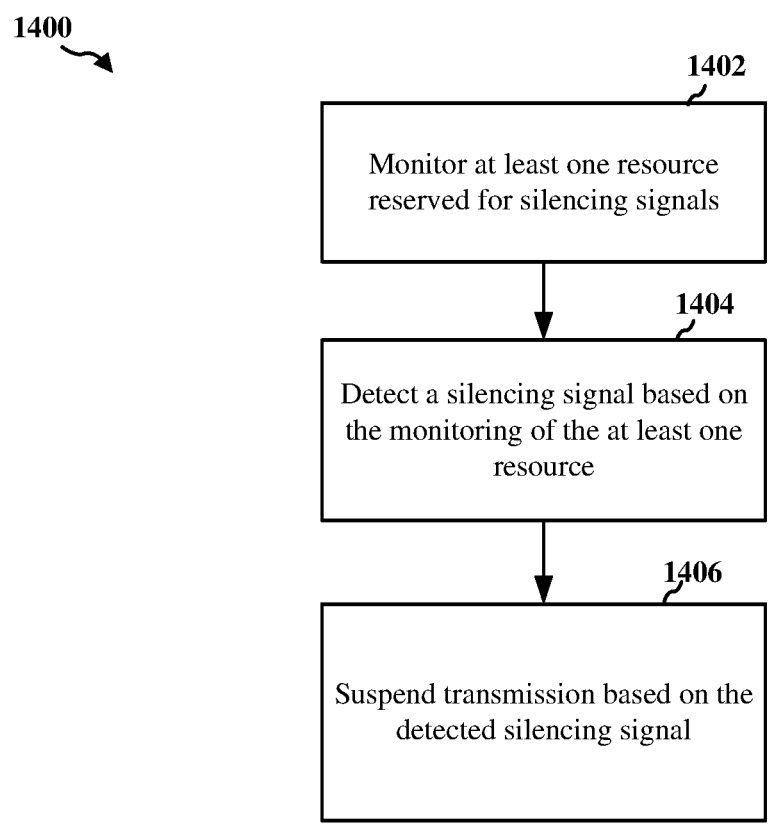
FIG. 14 is a flowchart of a method of wireless communication.

FIG. 14 is a flowchart of a method 1400 of wireless communication. The method may be performed by a UE (e.g., the UE 708, the apparatus 1702/1702'). In FIG. 14, various operations are illustrated as optional (e.g., denoted by dashed lines). However, the present disclosure contemplates operations in which one or more operations of the method 1400 are optional, omitted, and/or alternatively performed according to various aspects. Further, one or more operations of the method 1400 may be transposed and/or contemporaneously performed.

The method 1400 may begin with operation 1402. At operation 1402, the UE may monitor at least one resource reserved for silencing signals. In the context of FIG. 7, the UE 708 may monitor at least one resource reserved for silencing signals.

At operation 1404, the UE may detect a silencing signal based on the monitoring of the at least one resource. In the context of FIG. 7, the UE 708 may detect the silencing signal 744.

At operation 1406, the UE may suspend transmission based on the detected silencing signal. In the context of FIG. 7, the UE 708 may suspend transmission (e.g., to the base station 702) based on the detected silencing signal 744.

Figure 15:
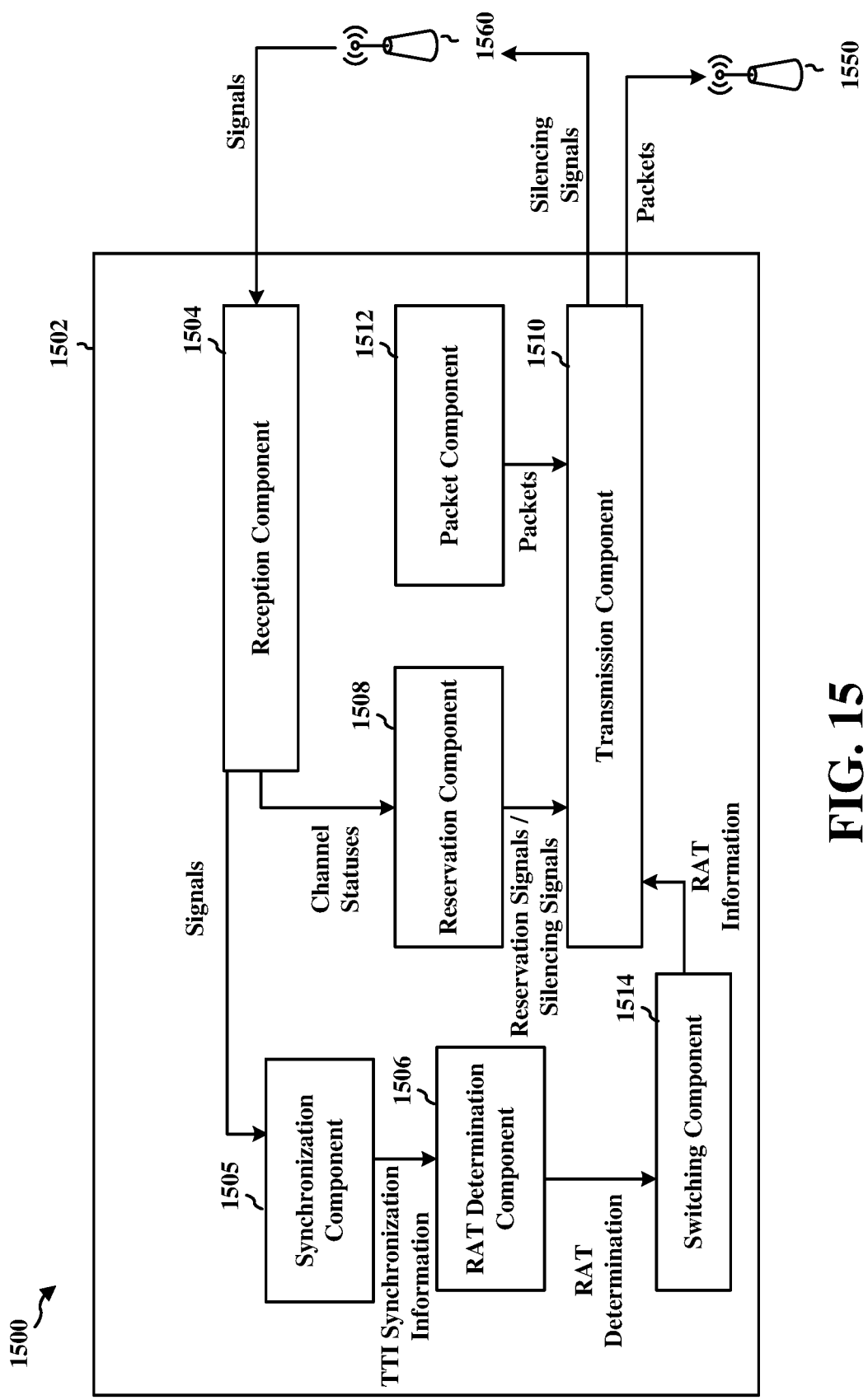
FIG. 15 is a conceptual data flow diagram illustrating the data flow between different means/components in an exemplary apparatus.

FIG. 15 is a conceptual data flow diagram 1500 illustrating the data flow between different means/components in an exemplary apparatus 1502. The apparatus may be a controller, such as the controller 404 and/or the controller 704.

The apparatus 1502 may include a reception component, which may be configured to receive signals (e.g., from a base station 1560). The apparatus 1502 may include a transmission component 1510, which may be configured to transmit signals (e.g., packets to a sensor 1550 and/or silencing signals to the base station 1560).

In an aspect, the apparatus 1502 may include a synchronization component 1505. The synchronization component 1505 may be configured to determine synchronization between a first RAT and a second RAT based on TTIs associated with the first RAT and TTIs associated with the second RAT. The synchronization component 1505 may be configured to provide TTI synchronization information to a RAT Determination Component 1506.

In an aspect, the synchronization component 1505 may be configured to adjust one or more of a length, a start boundary, or an end boundary of TTIs associated with the first RAT to align with the corresponding one or more of a length, a start boundary, or and end boundary of TTIs associated with the second RAT. For example, the synchronization component 1505 may adjust a length of a TTI associated with the first RAT to match the length of a TTI associated with the second RAT. Thus, data encapsulated into frames (and subframes) at higher layers of the synchronization component 1505 may occupy the same number of equal sized TTIs for transmission whether the communication link uses the first RAT or the second RAT.

According to one aspect, the synchronization component 1505 may align a start boundary and/or an end boundary of a TTI associated with the first RAT with a start boundary and/or end boundary of a TTI associated with the second RAT. For example, the synchronization component 1505 may adjust the start and end boundaries of a first TTI associated with the first RAT to match the start and end boundaries of a second TTI associated with the second RAT. In an aspect, alignment of TTIs implies that start and end boundaries of TTIs are the same (or substantially similar)—i.e., that the length of TTIs are the same (or substantially similar).

In one aspect, the synchronization component 1505 may align TTIs of downlink subframes associated with the first RAT with TTIs of downlink subframes associated with the second RAT.

In another aspect, the synchronization component 1505 may adjust one TTI of downlink subframe associated with the first RAT to align with one TTI of an uplink subframe associated with the second RAT. That is, the synchronization component 1505 may synchronize the communication bands by aligning TTIs associated with the first RAT with TTIs associated with the second RAT, but which are offset by one TTI. For example, a downlink subframe of the first RAT may include two TTIs, the first of which may align with a TTI of a downlink subframe associated with the second RAT and the second of which may align with a TTI of an uplink subframe associated with the second RAT.

In another aspect, the synchronization component 1505 may synchronize the communication bands by adjusting TTIs of downlink subframes associated with the first RAT to align with TTIs associated with uplink subframes associated with the second RAT. Accordingly, the synchronization component 1505 may adjust the TTIs of uplink subframes associated with the first RAT to align with TTIs of downlink subframes associated with the second RAT.

In an aspect, the RAT determination component 1506 may be configured to determine that communication is to be switched from the first RAT to the second RAT. For example, the RAT determination component 1506 may receive a NAK—e.g., a NAK 428 may indicate that the sensor 1550 was unable to decode the data included in a packet from the apparatus 1502. In response to the NAK, the RAT determination component 1506 may determine that the data should be retransmitted in a second packet. The RAT determination component 1506 may switch to the second RAT to transmit the second packet. The RAT determination component 1506 may switch to the second RAT after the synchronization between the first RAT and the second RAT.

In another aspect, the RAT determination component 1506 may switch to the second RAT based on a channel assessment in the first RAT. For example, the RAT determination component 1506 may determine that the first frequency band associated with the first RAT is occupied and, in response to the channel being occupied, the RAT determination component 1506 may switch to the second RAT. In another aspect, the RAT determination component 1506 may determine that channel conditions associated with the first RAT do not satisfy a QoS requirement (e.g., a value for a QoS metric fails to satisfy a threshold). For example, the RAT determination component 1506 may determine that transmitted packets using the first RAT are unsatisfactorily degraded and, in response, the RAT determination component 1506 may switch to the second RAT. The RAT determination component 1506 may be configured to provide an indication of the determination to switch RATs to a switching component 1514.

The switching component 1514 may be configured to switch communication between a first RAT and a second RAT. The switching component 1514 may be configured to switch between the first RAT and the second RAT based on determinations provided by the RAT determination component 1506. In an aspect, the switching component 1514 may provide an indication of the current RAT (i.e., the RAT on which communication is to occur) to the transmission component 1510.

The apparatus 1502 may further include a packet component 1512. The packet component 1512 may be configured to generate packets (e.g., MiCr packets). The packet component 1512 may generate packets based on information provided by another layer (e.g., an application layer). The packet component 1512 may provide packets to the transmission component 1510.

The transmission component 1510 may be configured to transmit packets (e.g., MiCr packets) to a sensor 1550 based on the RAT information provided by the switching component 1514.

In an aspect, the apparatus 1502 may be further include a reservation component 1508. The reservation component 1508 may be configured to detect channel occupancy based on signals received through the reception component 1504. In response, the reservation component 1508 may be configured to generate reservation signals to reserve a channel of a RAT for transmission of packets.

In another aspect, the reservation component 1508 may be configured to generate silencing signals to cause another wireless device (e.g., the base station 1560) to suspend communication in a RAT. The reservation component 1508 may be configured to provide silencing signals to the transmission component 1510, e.g., for transmission to the base station 1560.

The apparatus may include additional components that perform each of the blocks of the algorithm in the aforementioned flowcharts of FIGS. 11 and/or 12. As such, each block in the aforementioned flowcharts of FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
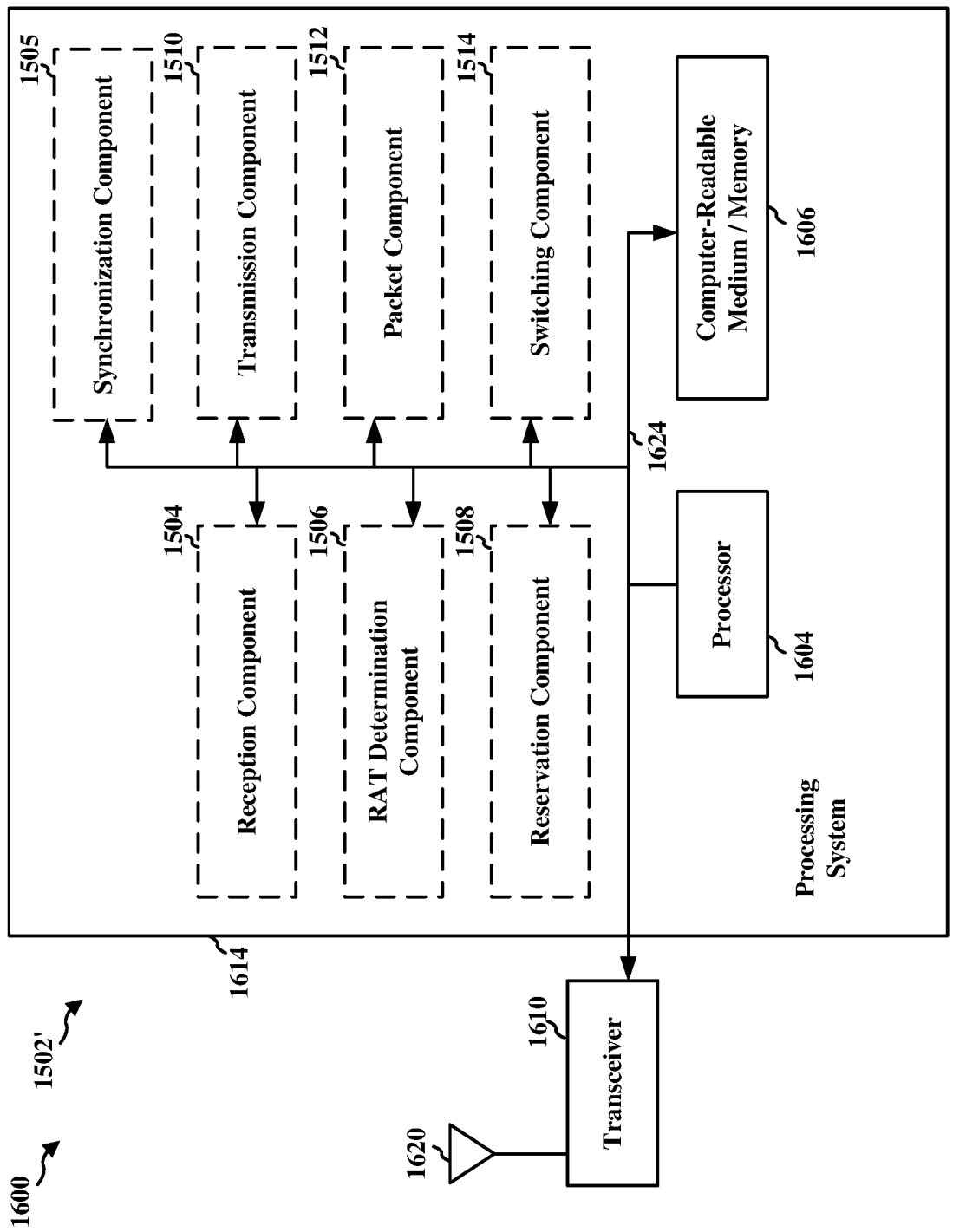
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1505, 1506, 1508, 1510, 1512, 1514, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1510, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1505, 1506, 1508, 1510, 1512, 1514. The components may be software components running in the processor 1604, resident/stored in the computer readable medium/memory 1606, one or more hardware components coupled to the processor 1604, or some combination thereof. The processing system 1614 may be a component of the eNB 310 and may include the memory 376 and/or at least one of the TX processor 316, the RX processor 370, and the controller/processor 375. In an alternative aspect, the processing system 1614 may be a component of the UE 350 and may include the memory 360 and/or at least one of the TX processor 368, the RX processor 356, and the controller/processor 359.

In one configuration, the apparatus 1502/1502' for wireless communication includes means for means for determining synchronization between a first RAT and a second RAT based on transmission time intervals associated with the first RAT and transmission time intervals associated with the second RAT. The apparatus 1502/1502' further includes means for switching from the first RAT to the second RAT after the determined synchronization between the first RAT the second RAT. The apparatus 1502/1502' further includes means for transmitting, during a TTI associated with the second RAT, a first packet using the second RAT based on the switch from the first RAT to the second RAT.

In an aspect, the means for transmitting is further configured to transmit a second packet using the first RAT before the switch to the second RAT. In an aspect, the means for transmitting is further configured to transmit the first packet using the first RAT during a TTI associated with the first RAT that aligns with the TTI associated with the second RAT. In an aspect, the apparatus 1502/1502' further includes means for performing carrier sensing using the first RAT. In an aspect, the apparatus 1502/1502' further includes means for broadcasting a reservation packet using the first RAT to reserve the first RAT until a start of a TTI associated with the second RAT. In an aspect, the reservation packet comprises a CTS message. In an aspect, the CTS message includes a NAV.

In an aspect, the means for determining synchronization between a first RAT and a second RAT based on transmission time intervals is configured to determine that a first TTI associated with the first RAT aligns with a second TTI associated with the second RAT, wherein both the first TTI and the second TTI are associated with downlink communication. In an aspect, the means for determining synchronization between a first RAT and a second RAT based on transmission time intervals is configured to determine that a first TTI associated with the first RAT aligns with a second TTI associated with the second RAT, wherein the first TTI is associated with uplink communication and the second TTI is associated with downlink communication.

In an aspect, the means for determining synchronization between a first band and a second band based on transmission time intervals is configured to determine that a first TTI associated with the first RAT is associated with uplink communication when the first packet is to be transmitted, and further configured to determine that a next TTI associated with the second RAT is associated with downlink communication.

In an aspect, the apparatus 1502/1502' may further include means for determining to switch from the first RAT to the second RAT based on at least one of reception of a NAK using the first RAT, performance of carrier sensing using the first RAT, or failure of a value for a QoS metric associated with the first RAT to satisfy a threshold, wherein switching from the first RAT to the second RAT is further based on the determination to switch from the first RAT to the second RAT.

In an aspect, the means for determining synchronization between a first RAT and a second RAT based on transmission time intervals is configured to adjust at least one of a length, a start boundary, or an end boundary of TTIs associated with either the first RAT or the second RAT to align with at least one of a length, a start boundary, or an end boundary of TTIs associated with the other of the first RAT or the second RAT. In an aspect, the first RAT is unlicensed and the second RAT is licensed.

In another aspect, the apparatus 1502/1502' includes means for determining that communication is to be switched from a first frequency band of a first RAT to a second frequency band of a second RAT. The apparatus 1502/1502' further includes means for switching to the second frequency band of the second RAT based on the determination that communication in the first frequency band is to be switched. The apparatus 1502/1502' further includes means for transmitting, in the second frequency band, a silencing signal indicating that another wireless device is to suspend communication in the second frequency band. The apparatus 1502/1502' further includes means for communicating in the second frequency band after the transmission of the silencing signal.

In an aspect, the other wireless device comprises an eNB. In an aspect, the means for transmitting, in the second frequency band, a silencing signal is configured to periodically transmit, in the second frequency band, the silencing signal. In an aspect, means for transmitting, in the second frequency band, a silencing signal is configured to transmit, in the second frequency band, the silencing signal on a PUSCH.

The apparatus 1502/1502' may further include means for transmitting, in the second frequency band, a second silencing signal to a UE. In an aspect, the silencing signal and the second silencing signal are each one half of an OFDM symbol. In an aspect, the silencing signal and the second silencing signal are each carried on at least one reserved resource block. In an aspect, the means for determining that communication in a first frequency band is not to continue is configured to detect that the first frequency band is occupied. In an aspect, the means for determining that communication in a first frequency band is not to continue is configured to determine that a value of a QoS metric does not satisfy a predetermined threshold. In an aspect, the QoS metric comprises a SNR or a BER.

In an aspect, the apparatus 1502/1502' further includes means for monitoring the first frequency band after the switch to the second frequency band. In an aspect, the apparatus 1502/1502' further includes means for resuming communication in the first frequency band based on the monitoring of the first frequency band. In an aspect, the means for communicating in the second frequency band is configured to transmit a packet at a TTI of the second frequency band that aligns with a TTI of the first frequency band. In an aspect, the first RAT is unlicensed and the second RAT is licensed.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
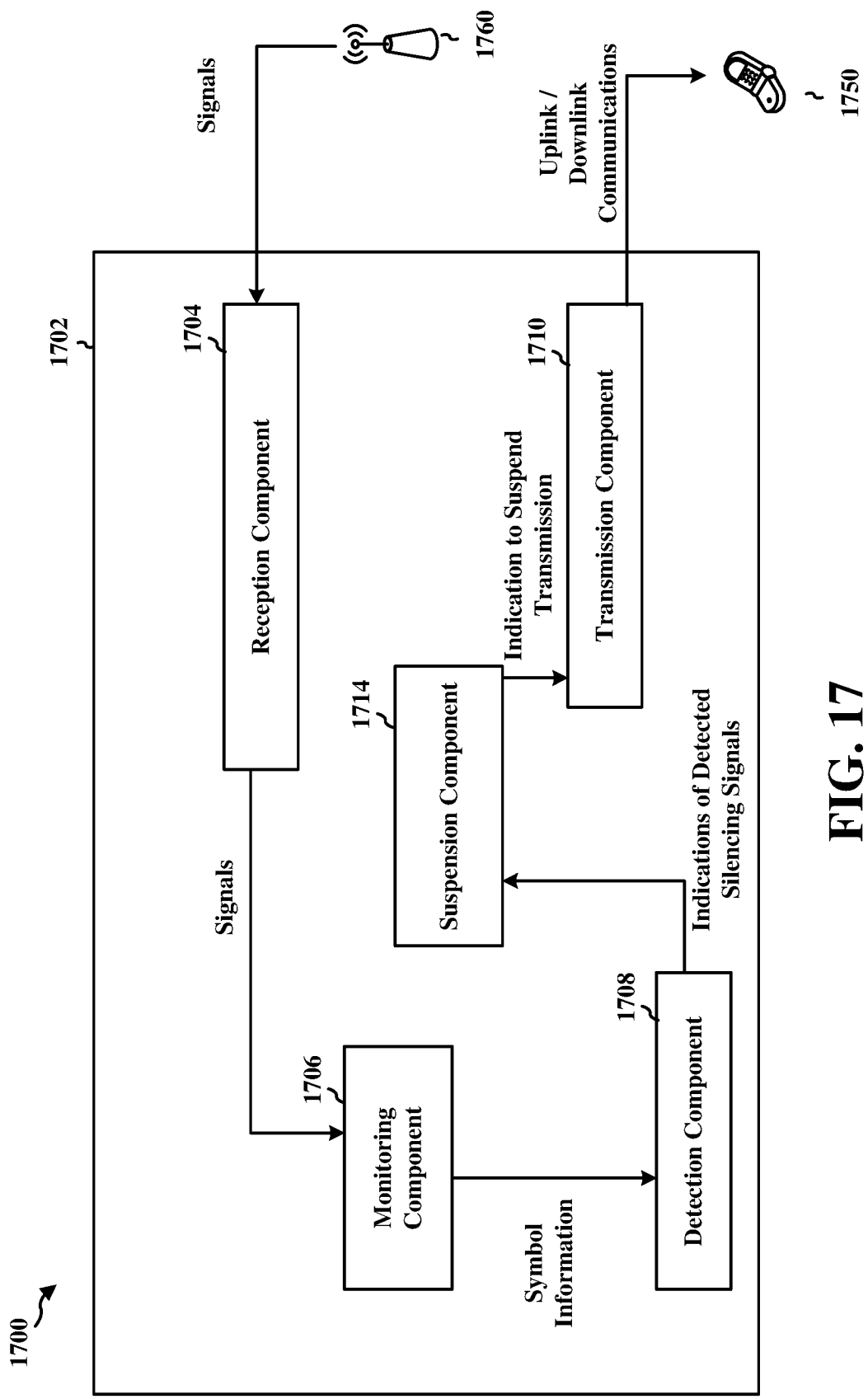
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a base station.

The apparatus 1702 may include a reception component 1704. The reception component 1704 may receive signals from a controller 1760.

The apparatus 1702 may include a monitoring component 1706 that is configured to monitor at least one resource reserved for silencing signals. The apparatus 1702 may include a detection component 1708 configured to detect a silencing signal based on the monitoring of the at least one resource. The apparatus 1702 may further include a suspension component configured to suspend communication based on detection of a silencing signal.

In an aspect, the apparatus 1702 may include a transmission component 1710. The suspension component 1714 may be configured to cause the transmission component 1710 to suspend transmission, e.g., to a UE 1750.

The apparatus may include additional components that perform each of the blocks of the algorithm in the aforementioned flowcharts of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
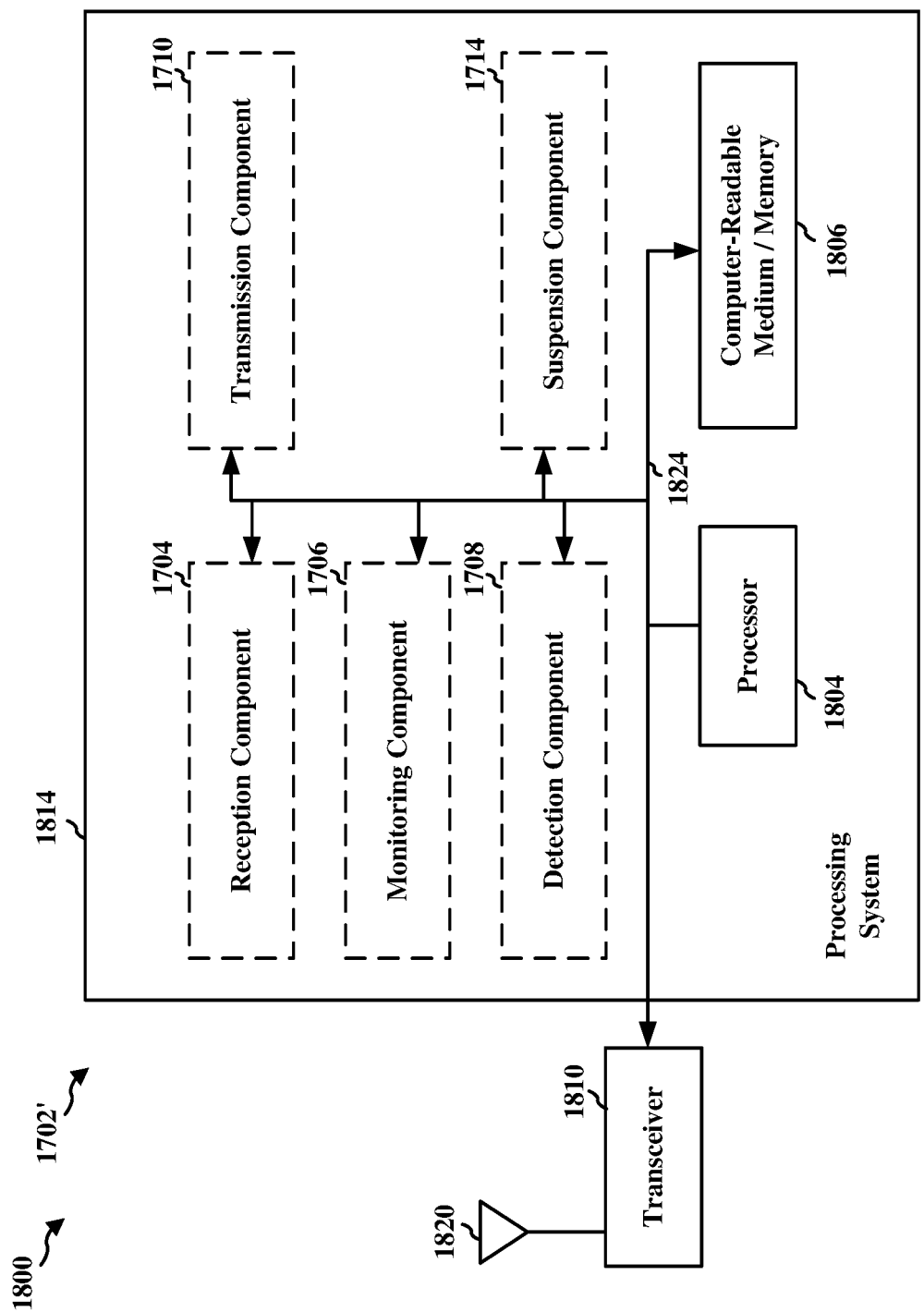
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1714 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1714. The components may be software components running in the processor 1804, resident/stored in the computer readable medium/memory 1806, one or more hardware components coupled to the processor 1804, or some combination thereof. The processing system 1814 may be a component of the eNB 310 and may include the memory 376 and/or at least one of the TX processor 316, the RX processor 370, and the controller/processor 375.

In one configuration, the apparatus 1702/1702' for wireless communication includes means for monitoring at least one resource reserved for silencing signals. The apparatus 1702/1702' further includes means for detecting a silencing signal based on the monitoring of the at least one resource. The apparatus 1702/1702' further includes means for suspending transmission based on the detected silencing signal. In an aspect, the means for suspending communication by the UE is configured to mute communication on a PDCCH. In an aspect, the at least one resource is an OFDM symbol associated with a PUSCH. In an aspect, the silencing signal is one half of an orthogonal OFDM symbol. In an aspect, the at least one resource is included in a resource block reserved for silencing signals, the resource block associated with a PUSCH.

The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19:
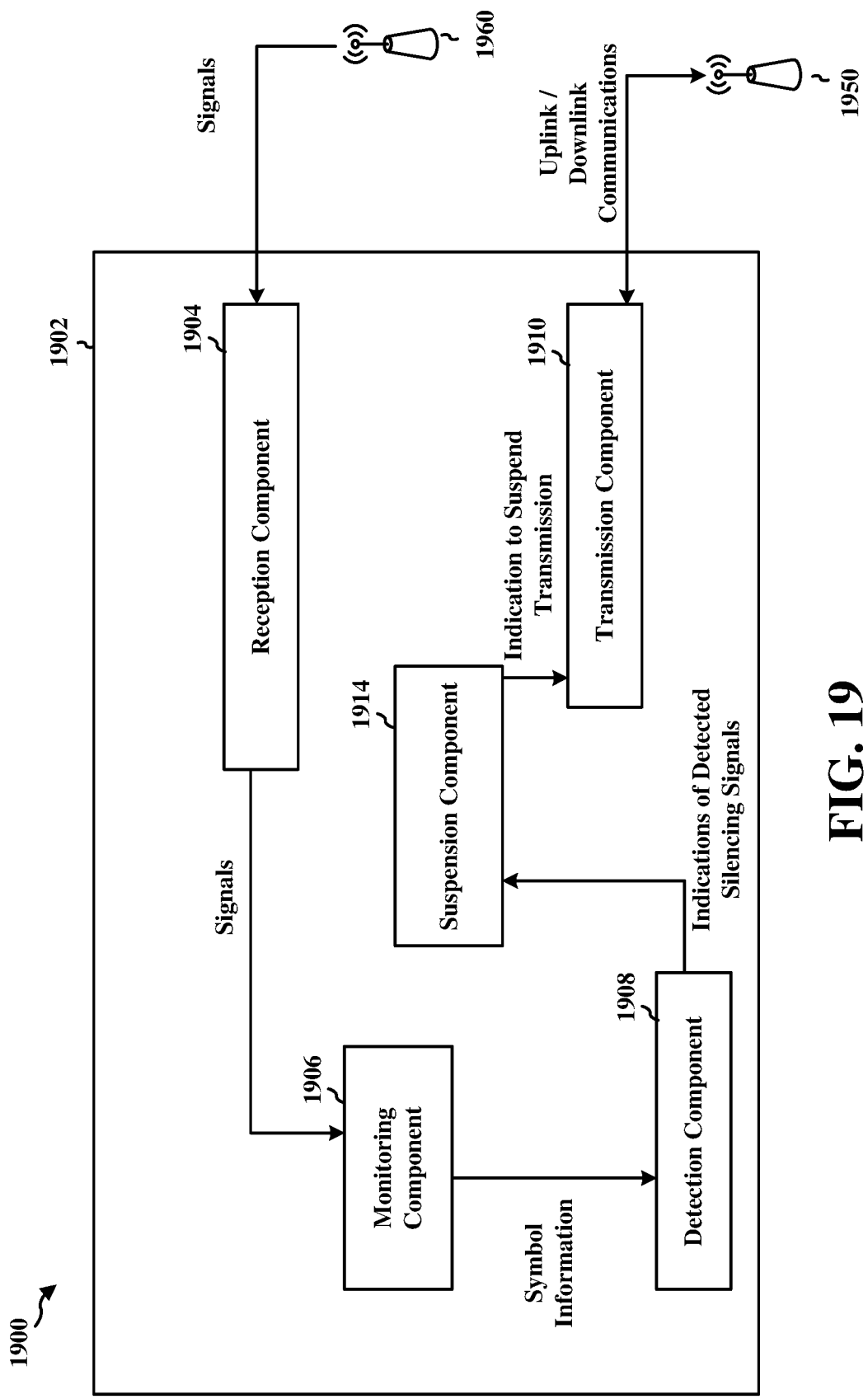
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be a UE.

The apparatus 1902 may include a reception component 1904. The reception component 1904 may receive signals from a controller 1960.

The apparatus 1902 may include a monitoring component 1906 that is configured to monitor at least one resource reserved for silencing signals. The apparatus 1902 may include a detection component 1908 configured to detect a silencing signal based on the monitoring of the at least one resource. The apparatus 1902 may further include a suspension component configured to suspend communication based on detection of a silencing signal.

In an aspect, the apparatus 1902 may include a transmission component 1910. The suspension component 1914 may be configured to cause the transmission component 1910 to suspend transmission, e.g., to a base station 1950

The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
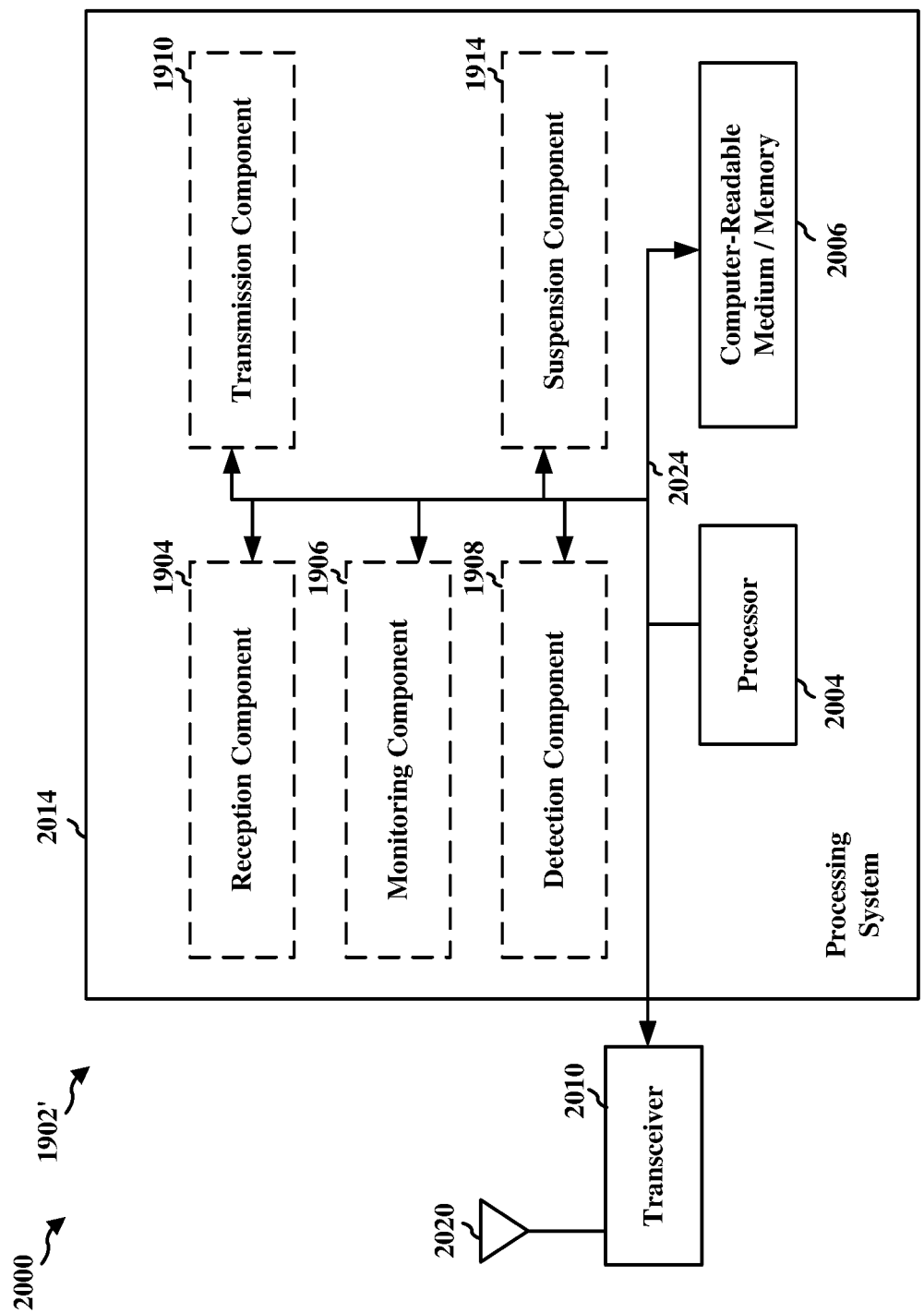
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1914 and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1914. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the apparatus 1902/1902' for wireless communication includes means for monitoring at least one resource reserved for silencing signals. The apparatus 1902/1902' further includes means for detecting a silencing signal based on the monitoring of the at least one resource. The apparatus 1902/1902' further includes means for suspending transmission based on the detected silencing signal. In an aspect, the at least one resource is an OFDM symbol associated with a PUSCH. In an aspect, the silencing signal is one half of an orthogonal OFDM symbol. In an aspect, the at least one resource is included in a resource block reserved for silencing signals, the resource block associated with a PUSCH.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, the method comprising:
adjusting one or more boundaries of transmission time intervals between a downlink transmission time interval (TTI) associated with a first radio access technology (RAT) and an uplink TTI associated with a second RAT, wherein a start boundary of the downlink TTI associated with the first RAT is adjusted to align in time with a start boundary of the uplink TTI associated with the second RAT;
determining synchronization between the first RAT and the second RAT based on the adjusted one or more boundaries of transmission time intervals;
switching from the first RAT to the second RAT after the determined synchronization between the first RAT and the second RAT; and
transmitting, during a TTI associated with the second RAT, a first packet using the second RAT based on the switch from the first RAT to the second RAT.

2. The method of claim 1, further comprising:
transmitting a second packet using the first RAT before the switch to the second RAT.

3. The method of claim 2, further comprising:
performing carrier sensing using the first RAT; and
broadcasting a reservation packet using the first RAT to reserve the first RAT until a start boundary of a TTI associated with the second RAT.

4. The method of claim 3, wherein the reservation packet comprises a clear-to-send (CTS) message.

5. The method of claim 4, wherein the CTS message includes a network allocation vector (NAV).

6. The method of claim 1, wherein the determining the synchronization between the first RAT and the second RAT further comprises adjusting a length of a TTI associated with either the first RAT or the second RAT to align a first length of the downlink TTI associated with the first RAT to a second length of the uplink TTI associated with the second RAT.

7. The method of claim 1, further comprising:
determining to switch from the first RAT to the second RAT based on at least one of reception of a negative acknowledgement (NAK) using the first RAT, performance of carrier sensing using the first RAT, or failure of a value for a quality-of-service (QoS) metric associated with the first RAT to satisfy a threshold,
wherein switching from the first RAT to the second RAT is further based on the determination to switch from the first RAT to the second RAT.

8. The method of claim 1, wherein the adjusting the one or more boundaries of the transmission time intervals comprises adjusting one or more of the start boundary or an end boundary of either the downlink TTI associated with the first RAT or the uplink TTI associated with the second RAT.

9. The method of claim 1, wherein the first RAT is unlicensed and the second RAT is licensed.

10. An apparatus for wireless communication, the apparatus comprising:
means for adjusting one or more boundaries of transmission time intervals between a downlink transmission time interval (TTI) associated with a first radio access technology (RAT) and an uplink TTI associated with a second RAT, wherein a start boundary of the downlink TTI associated with the first RAT is adjusted to align in time with a start boundary of the uplink TTI associated with the second RAT;
means for determining synchronization between the first RAT and the second RAT based on the adjusted one or more boundaries of transmission time intervals;
means for switching from the first RAT to the second RAT after the determined synchronization between the first RAT and the second RAT; and
means for transmitting, during a TTI associated with the second RAT, a first packet using the second RAT based on the switch from the first RAT to the second RAT.

11. The apparatus of claim 10, wherein the means for transmitting is further configured to transmit a second packet using the first RAT before the switch to the second RAT.

12. The apparatus of claim 10, further comprising:
means for performing carrier sensing using the first RAT; and
means for broadcasting a reservation packet using the first RAT to reserve the first RAT until a start boundary of a TTI associated with the second RAT.

13. The apparatus of claim 12, wherein the reservation packet comprises a clear-to-send (CTS) message.

14. The apparatus of claim 13, wherein the CTS message includes a network allocation vector (NAV).

15. The apparatus of claim 10, wherein the means for determining the synchronization between the first RAT and the second RAT is configured to adjust a length of a TTI associated with either the first RAT or the second RAT to align a first length of the downlink TTI associated with the first RAT to a second length of the uplink TTI associated with the second RAT.

16. The apparatus of claim 10, further comprising:
means for determining to switch from the first RAT to the second RAT based on at least one of reception of a negative acknowledgement (NAK) using the first RAT, performance of carrier sensing using the first RAT, or failure of a value for a quality-of-service (QoS) metric associated with the first RAT to satisfy a threshold,
wherein switching from the first RAT to the second RAT is further based on the determination to switch from the first RAT to the second RAT.

17. The apparatus of claim 10, wherein the means for adjusting the one or more boundaries of the transmission time intervals is further configured to adjust one or more of the start boundary or an end boundary of either the downlink TTI associated with the first RAT or the uplink TTI associated with the second RAT.

18. The apparatus of claim 10, wherein the first RAT is unlicensed and the second RAT is licensed.

19. An apparatus for wireless communication, the apparatus comprising:
- a memory; and
- at least one processor coupled to the memory and configured to:
  - adjust one or more boundaries of transmission time intervals between a downlink transmission time interval (TTI) associated with a first radio access technology (RAT) and an uplink TTI associated with a second RAT, wherein a start boundary of the downlink TTI associated with the first RAT is adjusted to align in time with a start boundary of the uplink TTI associated with the second RAT;
  - determine synchronization between the first RAT and the second RAT based on the adjusted one or more boundaries of transmission time intervals;
  - switch from the first RAT to the second RAT after the determined synchronization between the first RAT and the second RAT; and
  - transmit, during a TTI associated with the second RAT, a first packet using the second RAT based on the switch from the first RAT to the second RAT.

20. The apparatus of claim 19, wherein the at least one processor is configured to determine the synchronization between the first RAT and the second RAT based on adjusting a length of a TTI associated with either the first RAT or the second RAT to align a first length of the downlink TTI associated with the first RAT to a second length of the uplink TTI associated with the second RAT.

21. The apparatus of claim 19, wherein the at least one processor configured to adjust the one or more boundaries of the transmission time intervals is further configured to adjust one or more of the start boundary or an end boundary of the first downlink TTI associated with the first RAT or the uplink TTI associated with the second RAT.

22. A non-transitory computer-readable medium storing computer-executable code for wireless communication, the code, which when executed by at least one processor, causes the at least one processor to:
- adjust one or more boundaries of transmission time intervals between a downlink transmission time interval (TTI) associated with a first radio access technology (RAT) and an uplink TTI associated with a second RAT, wherein a start boundary of the downlink TTI associated with the first RAT is adjusted to align in time with a start boundary of the uplink TTI associated with the second RAT;
- determine synchronization between the first RAT and the second RAT based on the adjusted one or more boundaries of transmission time intervals;
- switch from the first RAT to the second RAT after the determined synchronization between the first RAT and the second RAT; and
- transmit, during a TTI associated with the second RAT, a first packet using the second RAT based on the switch from the first RAT to the second RAT.

* * * * *